US007512272B2

(12) United States Patent
Mayzlin et al.

(10) Patent No.: US 7,512,272 B2
(45) Date of Patent: *Mar. 31, 2009

(54) METHOD FOR OPTICAL RECOGNITION OF A MULTI-LANGUAGE SET OF LETTERS WITH DIACRITICS

(75) Inventors: Isaac Mayzlin, Vista, CA (US); Emily Ann Deere, Encinitas, CA (US)

(73) Assignee: Cardiff Software, Inc., Vista, CA (US)

( * ) Notice: Subject to any disclaimer, the term of this patent is extended or adjusted under 35 U.S.C. 154(b) by 900 days.

This patent is subject to a terminal disclaimer.

(21) Appl. No.: 10/959,447

(22) Filed: Oct. 5, 2004

(65) Prior Publication Data

US 2005/0123199 A1    Jun. 9, 2005

Related U.S. Application Data

(63) Continuation of application No. 09/704,043, filed on Nov. 1, 2000, now Pat. No. 6,920,247.

(60) Provisional application No. 60/214,522, filed on Jun. 27, 2000.

(51) Int. Cl.
  *G06K 9/18* (2006.01)
  *G06K 9/34* (2006.01)
(52) U.S. Cl. .................. 382/185; 382/173; 382/175; 382/177
(58) Field of Classification Search ........... 382/173, 382/175, 176, 177, 182, 185, 198
See application file for complete search history.

(56) References Cited

U.S. PATENT DOCUMENTS

| | | | |
|---|---|---|---|
| 4,193,212 A | 3/1980 | Al-Kufaishi | |
| 4,603,330 A * | 7/1986 | Horne et al. | 345/467 |
| 5,198,978 A | 3/1993 | Garneau et al. | |
| 5,231,581 A | 7/1993 | Garneau et al. | |
| 5,373,566 A * | 12/1994 | Murdock | 382/156 |

(Continued)

FOREIGN PATENT DOCUMENTS

JP    11-338977    10/1999

OTHER PUBLICATIONS

Collins, P. et al. "Fine phonetic labeling methodology for speech recognition research", Acoustics, Speech, and Signal Processing, IEEE International Conference on ICASSP 1986, vol. 11, Apr. 1986 pp. 2779-2782.*

(Continued)

*Primary Examiner*—Brian Q Le
(74) *Attorney, Agent, or Firm*—Knobbe Martens Olsen & Bear LLP

(57) ABSTRACT

A method and system for recognizing alphabetic characters that contain diacritics is described. An image analysis separates the character into its constituent components. The one or more diacritic components are then distinguished and isolated from the base portion of the character. Optical recognition is performed separately on the base portion. The diacritic is recognized through a special image analysis and pattern recognition algorithms. The image analysis extracts geometric information from the one or more diacritic components. The extracted information is used as input for the pattern recognition algorithms. The output is a code that corresponds to a particular diacritic. The recognized base portion and diacritic are combined and a check is performed for acceptable combinations in a chosen language. By separately recognizing the base portion and diacritic, the character sets used by the recognizer can be narrowed, resulting in greater recognition.

32 Claims, 21 Drawing Sheets

U.S. PATENT DOCUMENTS

| | | | |
|---|---|---|---|
| 5,555,101 | A | 9/1996 | Larson et al. |
| 5,893,133 | A | 4/1999 | Chen |
| 5,896,470 | A | 4/1999 | Miyaza |
| 5,933,525 | A | 8/1999 | Makhoul et al. |
| 5,943,137 | A | 8/1999 | Larson et al. |
| 5,974,191 | A | 10/1999 | Harada et al. |
| 6,014,615 | A | 1/2000 | Chen |
| 6,073,146 | A | 6/2000 | Chen |
| 6,272,495 | B1 | 8/2001 | Hetherington |
| 6,381,616 | B1 | 4/2002 | Larson et al. |

OTHER PUBLICATIONS

Caere Professional Developer's Kit Reference Manual, Appendix E, pp. 441-447, version 6.1.2.

ScanSoft OmniPage Pro 10—All About OCR, from www.caere.com/products/omnipage/pro/whatsocr.asp: printed on May 24, 2000.

OCR and Text Recognition: Commercial Research and Products, from http://hera.itc.it:3003/~messelod/OCR/Products.html, printed on Mar. 1, 2000.

Hariton, "Handwritten Script Recognition System for Languages with Diacritic Signs," IEEE, 1998, pp. 1188-1193.

* cited by examiner

Figure 1 - Top Level Flow

Figure 2 - Character Recognition

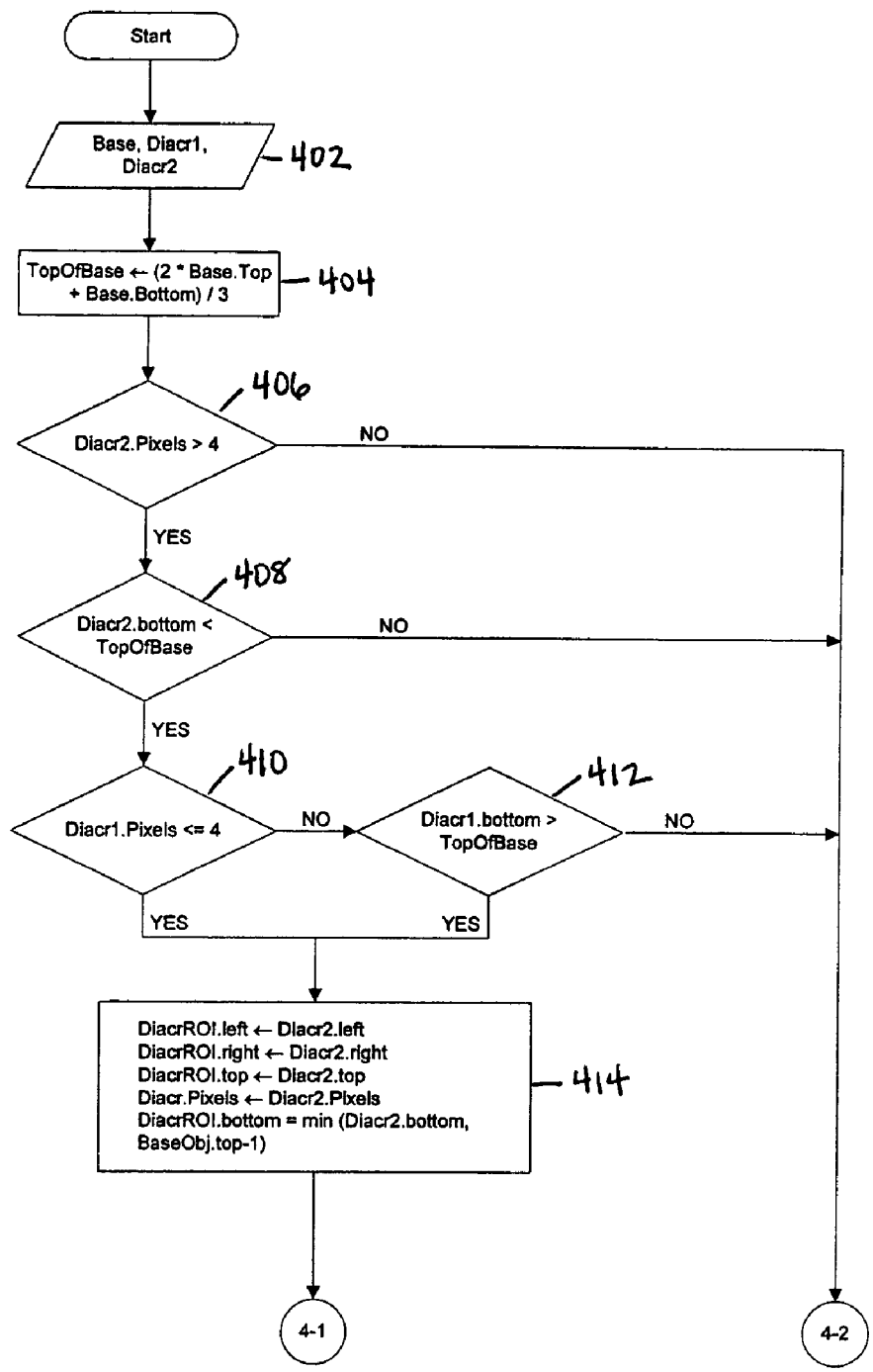
Figure 4a - Determining Diacritic Boundaries

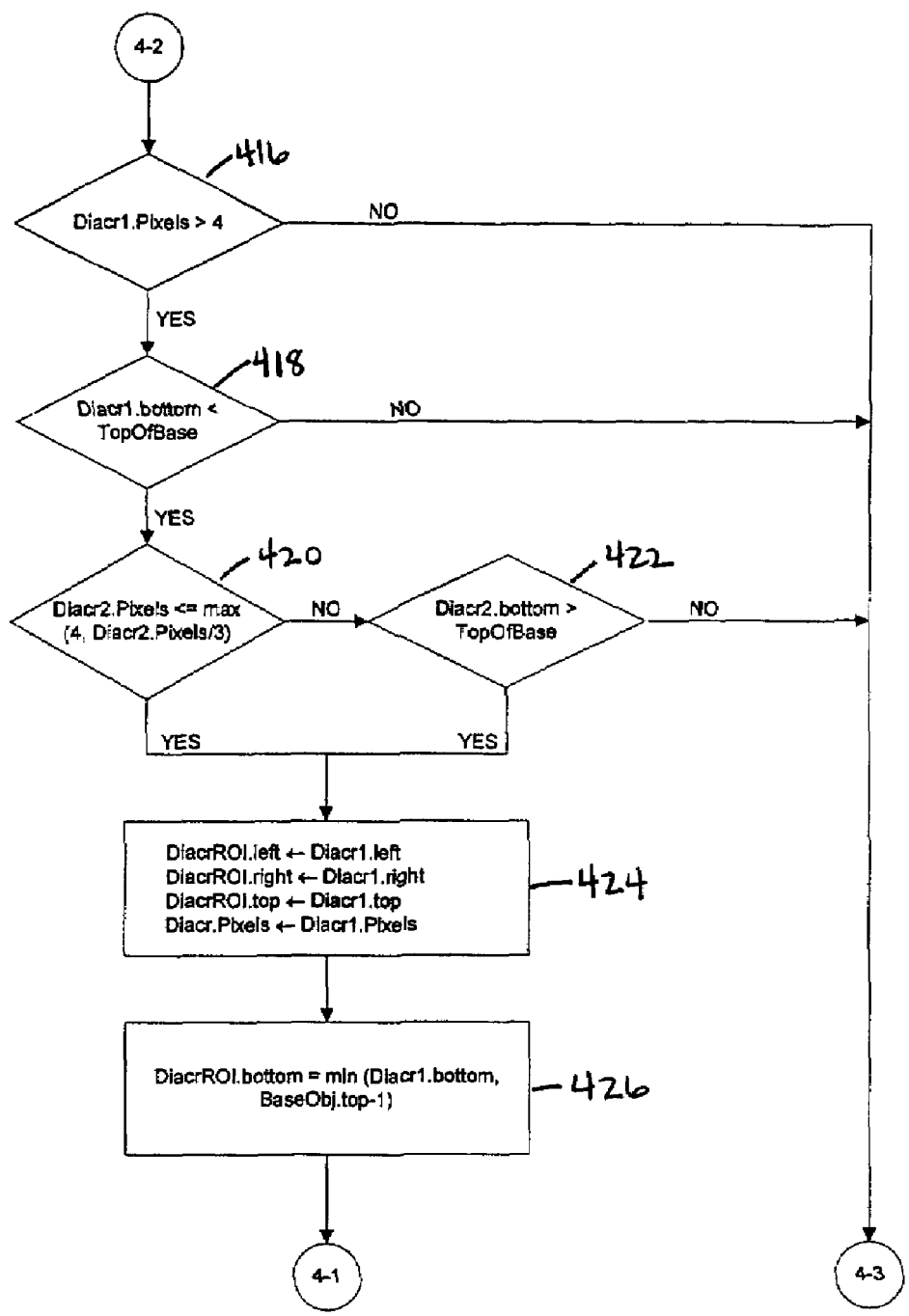
Figure 4b - Determining Diacritic Boundaries

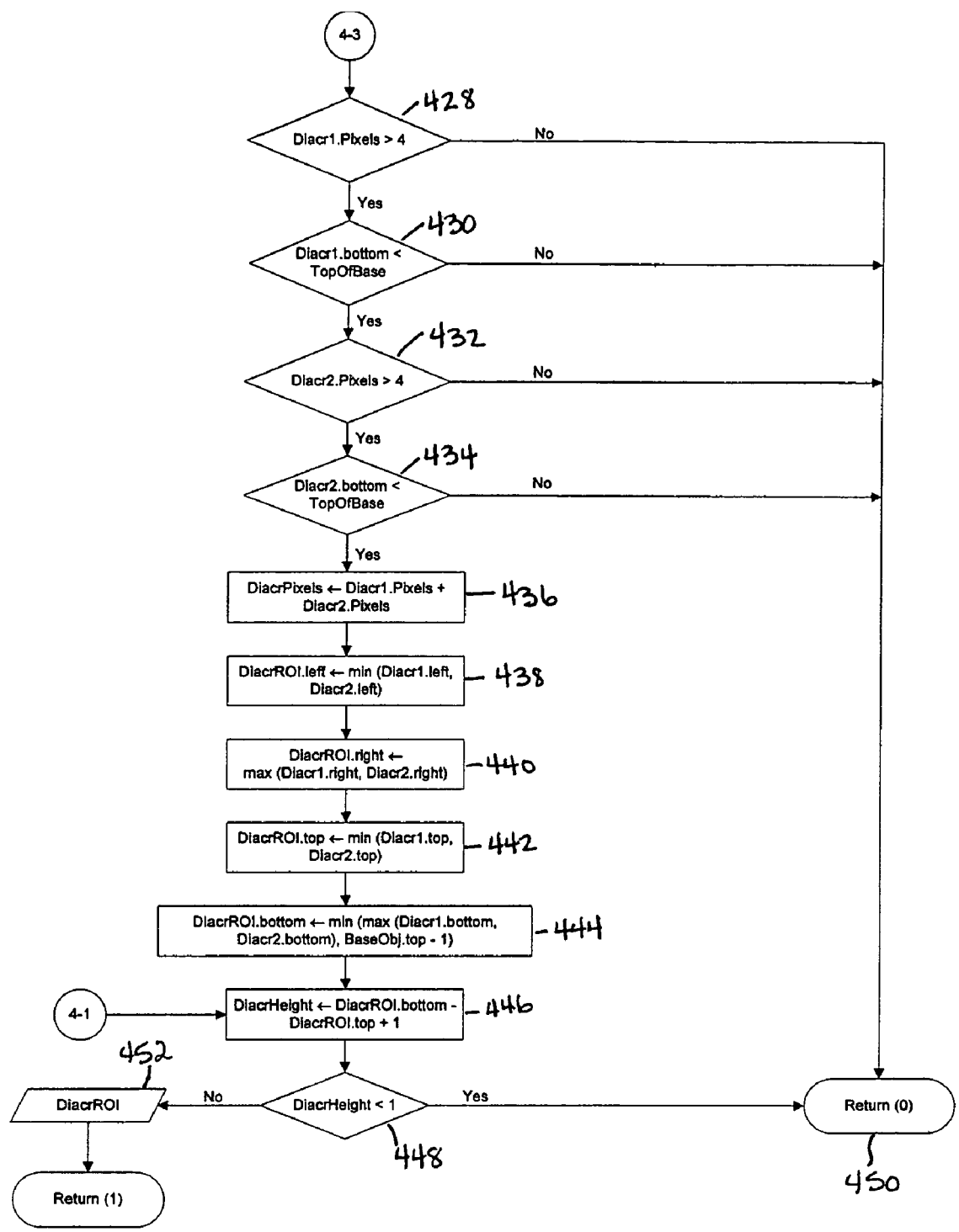
Figure 4c - Determining Diacritic Boundaries

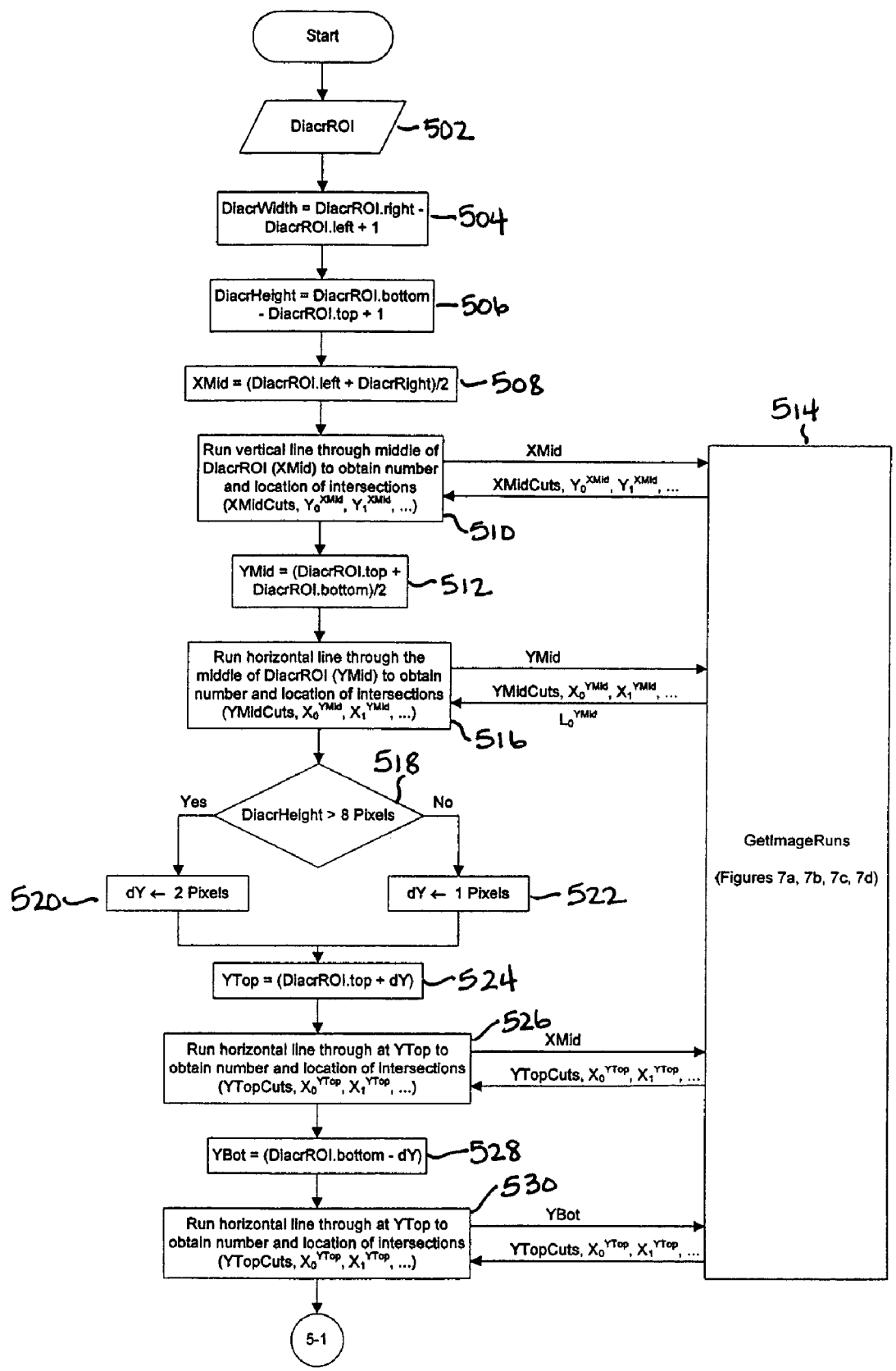
Figure 5a - Identification of the Diacritic

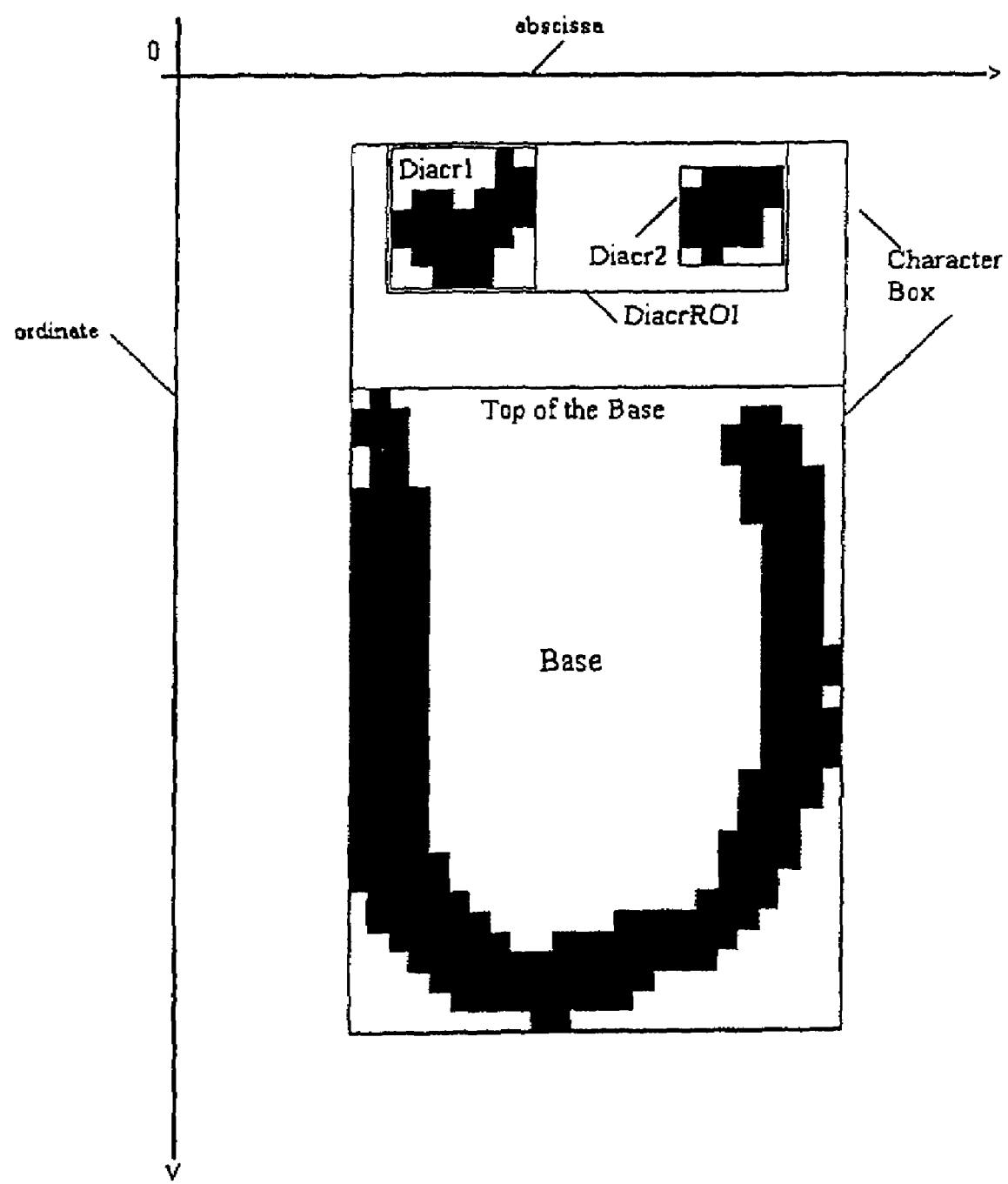
Figure 8. Character Parts Segmentation (Base, Diacr1, Diacr2) and Diacritic Boundaries (DiacrROI).

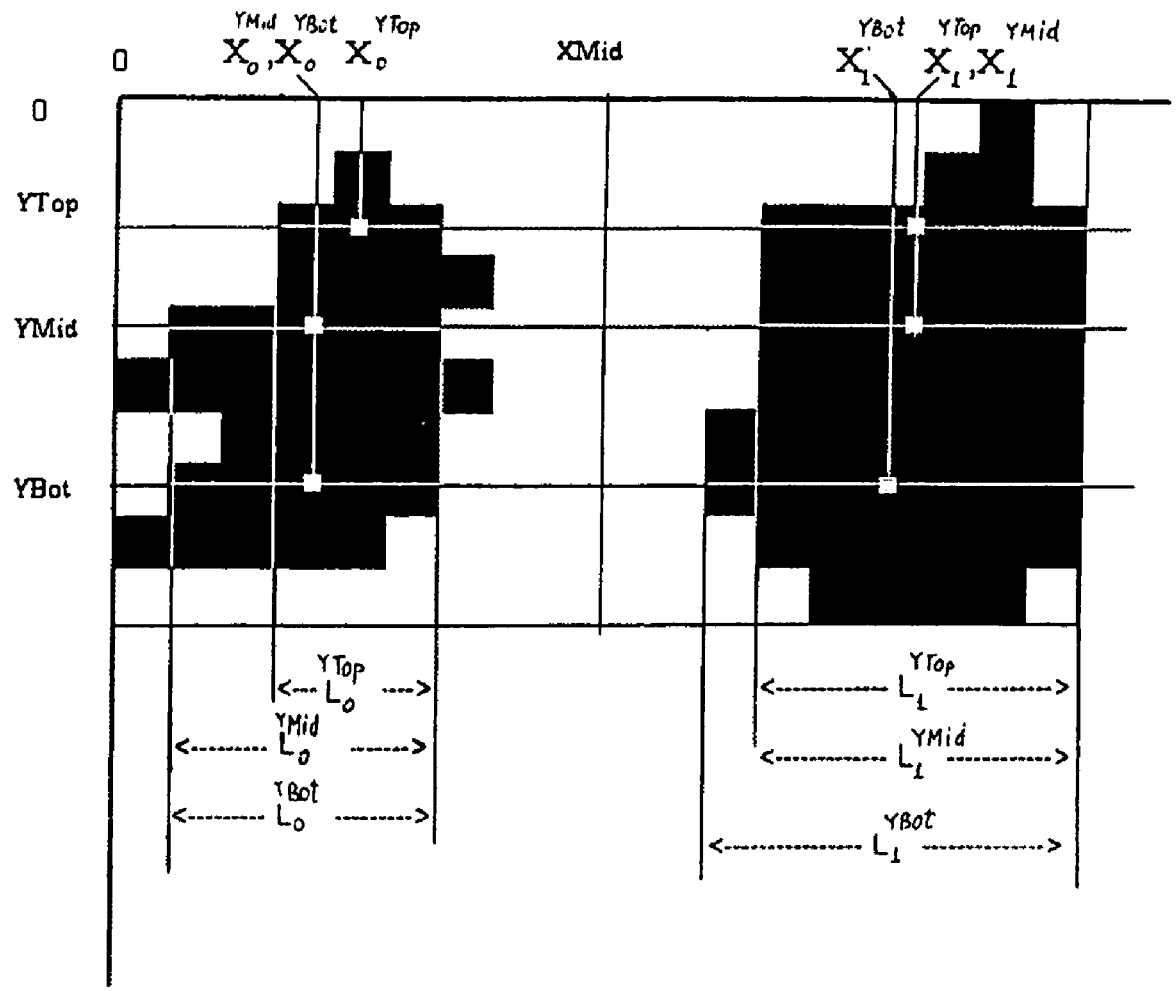
Figure 9. Spatial features for recognition of diaresis
(Diacritic Code 7)

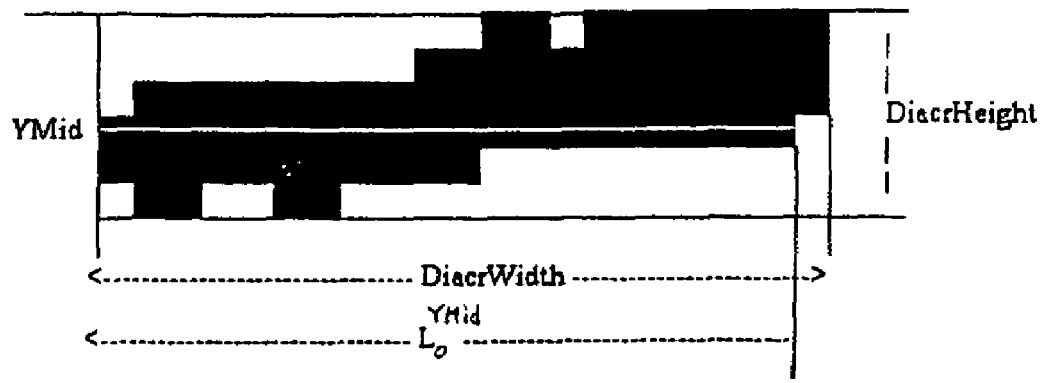
Figure 10. Spatial features for recognition of horizontal bar (Diacritic Code 9)
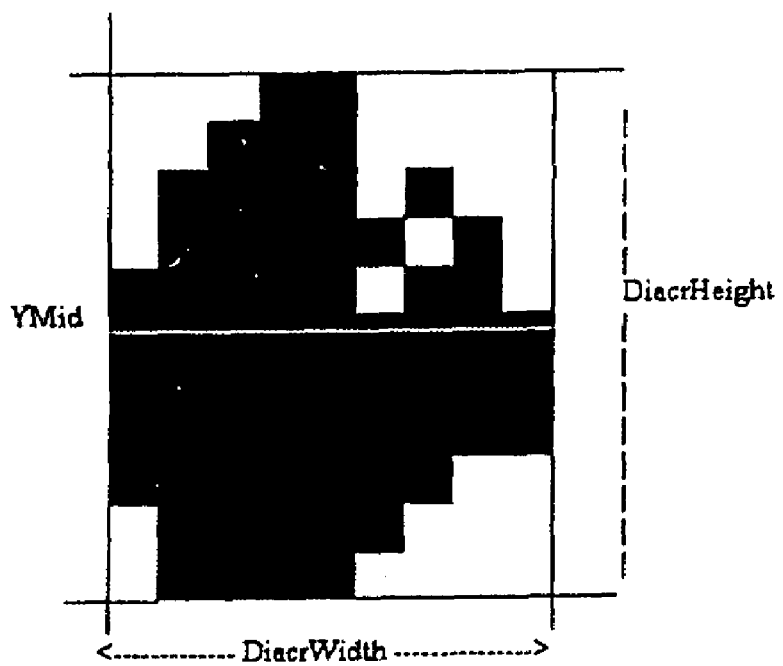
Figure 11. Spatial feature for recognition of dot above (Diacritic Code 1)

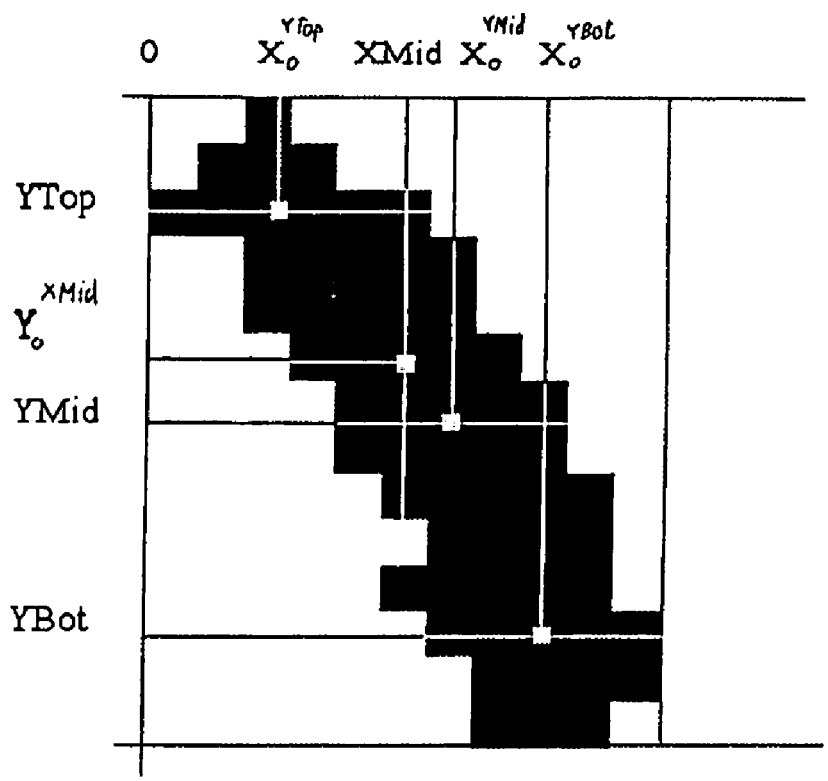
Figure 12. Spatial features for recognition of grave accent (Diacritic Code 2)
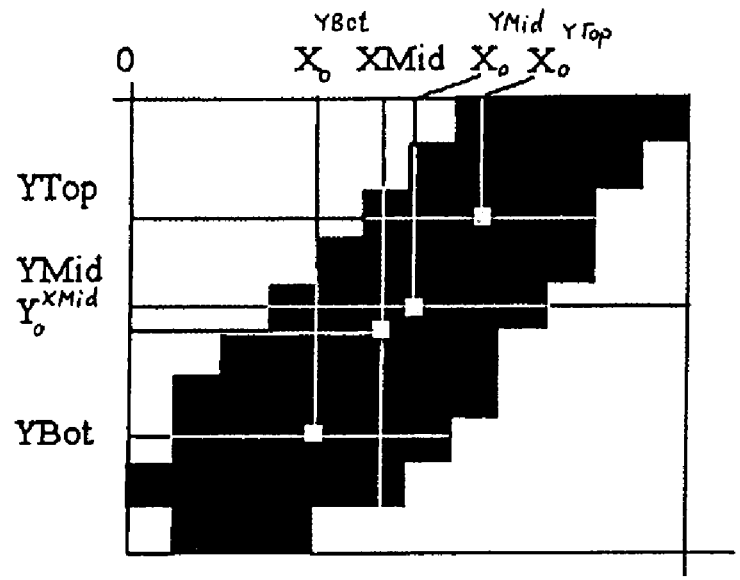
Figure 13. Spatial features for recognition of acute accent (Diacritic Code 3)

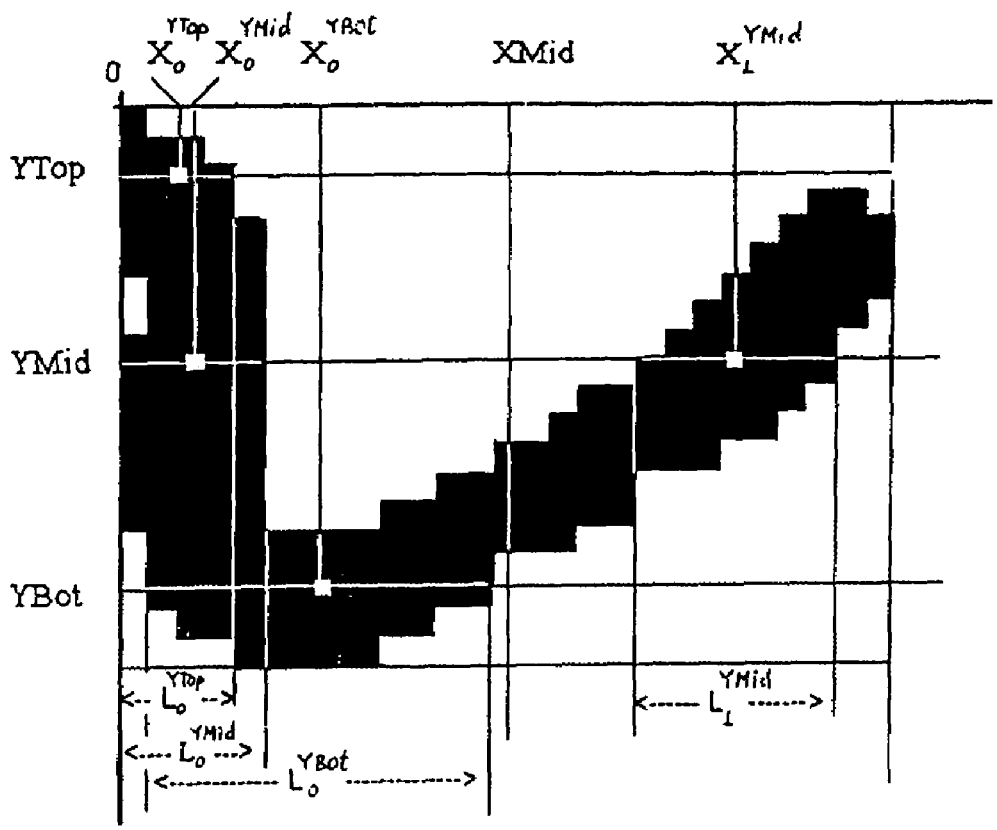
Figure 14. Spatial features for recognition of caron (Diacritic Code 8)
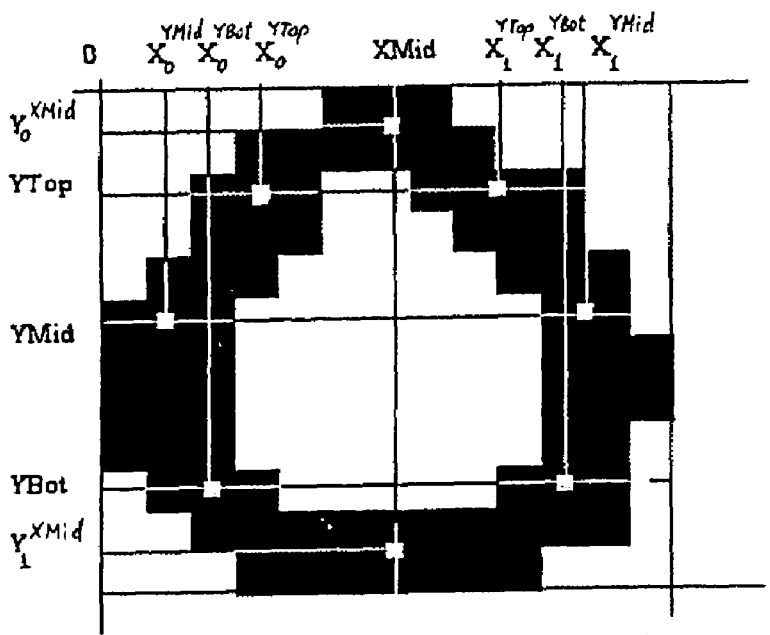
Figure 15. Spatial features for recognition of ring (Diacritic Code 6)

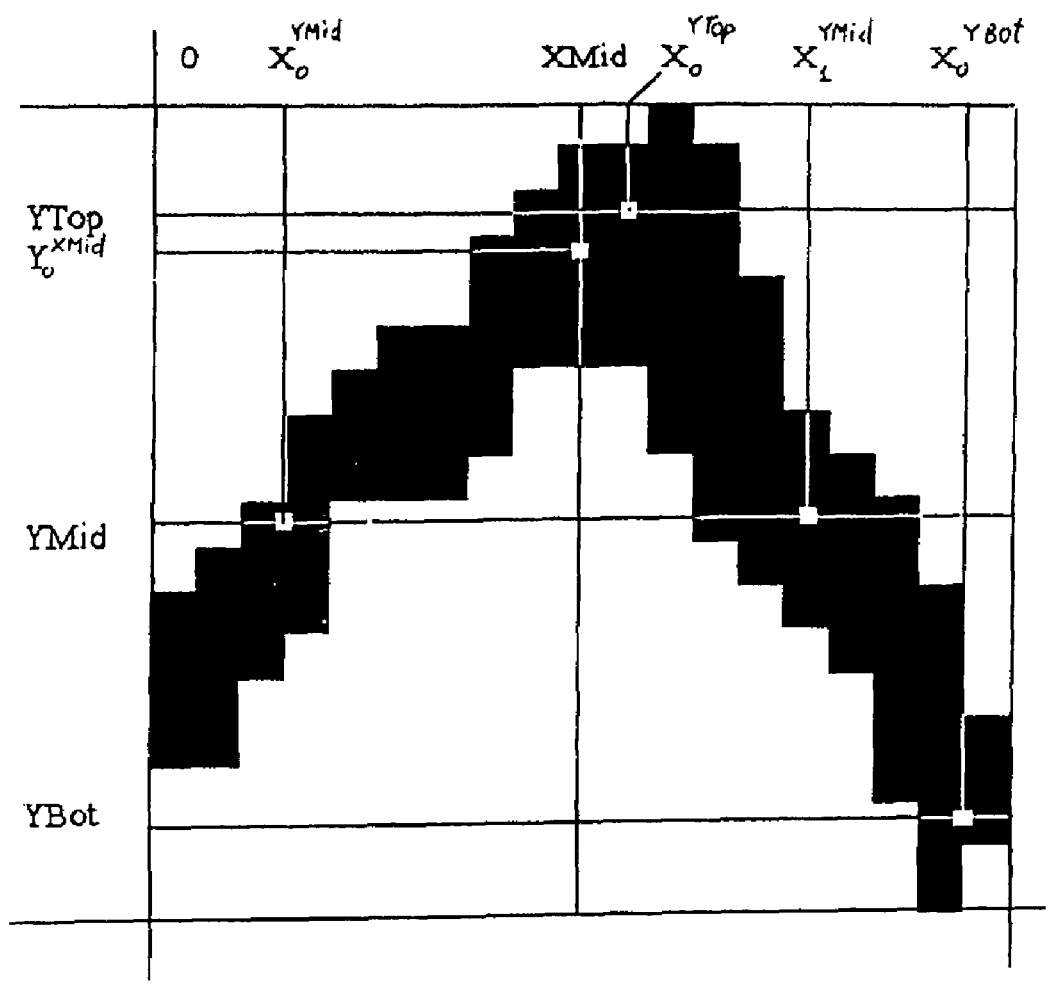
Figure 16. Spatial features for recognition of circumflex (Diacritic Code 4)
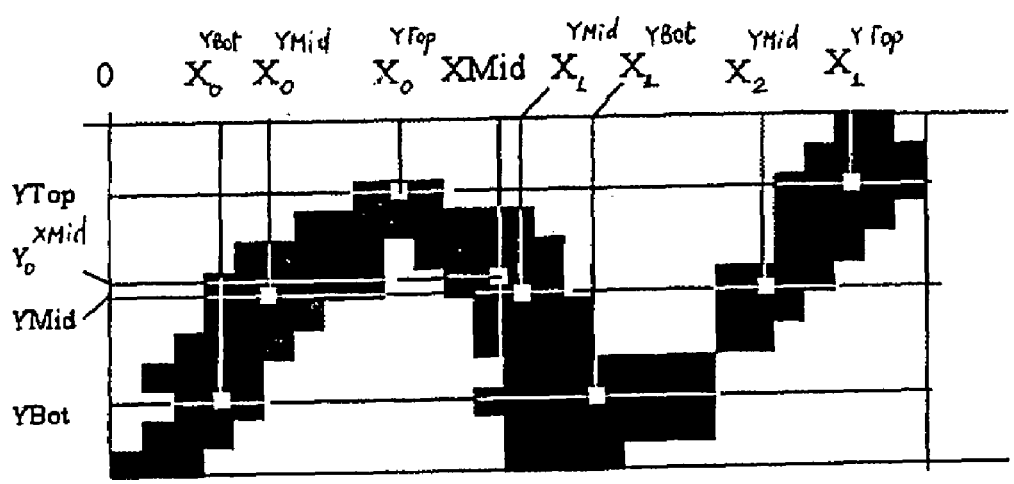
Figure 17. Spatial features for recognition of tilde (Diacritic Code 5)

METHOD FOR OPTICAL RECOGNITION OF A MULTI-LANGUAGE SET OF LETTERS WITH DIACRITICS

RELATED APPLICATIONS

This application is a continuation of U.S. application Ser. No. 09/704,043, filed Nov. 1, 2000 now U.S. Pat. No. 6,920, 247, which claims the benefit, under 35 U.S.C. § 119(e), of U.S. Provisional Patent Application No. 60/214,522, filed Jun. 27, 2000, each of which is incorporated by reference.

BACKGROUND OF THE INVENTION

1. Field of the Invention

This invention relates generally to the optical recognition of text. In particular, the invention provides a method for identification of characters having diacritic marks.

2. Description of the Prior Art

Applications that use optical recognition for extracting data from a document must first create an electronic copy of the document in one of the plurality of standard image formats using a scanner, facsimile machine, digital camera or other similar digitization device. Using image-processing algorithms, text characters are then isolated so that each may be individually recognized. In forms processing, isolation can occur using constrained print fields. Here, form fields are provided with certain attributes that segment the field into individually spaced regions. Boxed or combed representations suggest to the filler of the form that characters should be printed or written in these spaced regions. If form fields do not use constrained print fields, an automatic segmentation process is typically used to isolate the individual characters prior to recognition. The segmentation process uses various geometric parameters, such as line spacing, font size, average character spacing, and average character width, to box the characters into a segmented region. Whichever method is used to isolate the characters, the images of the isolated regions are digitized into the form of character bitmap; e.g. the rectangular matrix of pixels. Proprietary recognition algorithms analyze the character bitmaps to determine their computer-defined identity (code). With the identification, a computer system can output text, corresponding to a character bitmap, to an output medium.

The proprietary recognition algorithms used in the prior art use all of the character bitmap as input in making their determination (although some of the pixels may be removed through pre-recognition filtering mechanisms). Regardless of whether the character consists of a body portion (Base) only, or a Base with diacritics (marks used for providing phonetic information or distinguishing a Base), the algorithm processes all of the information in one instance.

In non-English languages, diacritics are prevalently used with many of the alphabetical characters. The classifier, a module that limits the choices of the output to a certain specified character set, must process characters both with and without diacritics. The greater the number of characters in the set, the greater the potential for recognition error and the slower the application processing speed. For instance, in the French alphabet there are 78 uppercase and lowercase letters in the alphabet. The recognition classifier has to decide between 78 different characters. Of these 78 characters, many are identical in Base but possessing different diacritics. When the diacritics are different but visually similar, selection of the correct character becomes much more difficult. This is especially true since most writers pay little attention to the quality and exactitude of the diacritic mark when putting pen to paper.

SUMMARY OF THE INVENTION

A reduction in the classifier's character set has the advantage of reduced computational complexity, increased processing speeds and higher recognition rates. In the present invention, this is accomplished through special image processing of the character bitmap prior to recognition. Preprocessing includes physical separation of the diacritic from the Base so that recognition can take place separately on the Base and diacritic.

First, recognition is performed on the Base. The diacritic then undergoes a special features extraction analysis. Certain geometric information is obtained through the analysis that allows determination of the diacritic most likely described by that geometry. Next, a diacritic matching algorithm ensures acceptable combinations of the recognized Base and analyzed diacritic for a given non-English language. A computer code is then assigned which corresponds to text output.

In the example given above (under "Background of the Invention"), of the 78 different characters, the French language is comprised of 54 uppercase and lowercase Base components and five (5) separate diacritic marks used in various combinations with the Base components. With only five diacritics for the classifier to choose from, errors are rare. Furthermore, the alphabet class has been reduced by nearly a third (from 78 to 54) making recognition of the Base that much simpler. By checking for acceptable combinations, recognition accuracy increases even further.

In one embodiment of the invention, there is a method of identifying characters in a character recognition system, the method comprising a) analyzing a character image for separation and extraction of a base character and one or more diacritics, b) applying optical character recognition or intelligent character recognition algorithms to the base character, c) processing the diacritics with at least one of image analysis and pattern recognition algorithms, and d) combining the results of b) and c) so as to check for acceptable combinations of the base character and diacritics with respect to one or more specific languages.

In another embodiment of the invention, there is a method of identifying characters having a diacritic component in a character recognition system, the method comprising segmenting a base component and a diacritic component from a character image, recognizing the base component, recognizing the diacritic component, performing a match analysis to determine whether the base component and the diacritic component is an acceptable combination for one or more particular languages, and recognizing the combination of the base component and the diacritic component in response to the match analysis.

In another embodiment of the invention, there is a system for recognizing characters, the system comprising a) an analysis process configured to analyze a character image so as to segment a base component and one or more diacritic components, b) a character recognition algorithm configured to recognize the base component, c) a diacritic recognition algorithm configured to process the diacritic components of the character image, and d) a diacritic matching algorithm configured to combine the results of b) and c) to check for acceptable combinations of the base component and diacritic components for specific languages.

In yet another embodiment of the invention, there is a system of identifying characters having a diacritic component, the system comprising a character parts segmentation process configured to segment a character image so as to extract a base component and a diacritic component; a character recognition algorithm configured to recognize the base component; a diacritic recognition algorithm configured to recognize the diacritic component of the character image; and a diacritic matching algorithm configured to determine whether the base component and the diacritic component are an acceptable combination for a particular language and to recognize the combination.

BRIEF DESCRIPTION OF THE DRAWINGS

FIGS. 4a-4c show the process flow for establishing boundaries around a diacritic.

FIGS. 5a-5c depict the steps, using the determined boundaries and the character bitmap, to extract topological features for use in recognition of the diacritic.

FIG. 8 provides an example of a Base and diacritic and shows some of the analytical features described in the application.

FIG. 9 shows a diacritic for one embodiment and some of the topological features used to determine its identity (Diacritic Code 7).

FIG. 10 shows a diacritic for one embodiment and some of the topological features used to determine its identity (Diacritic Code 9).

FIG. 11 shows a diacritic for one embodiment and some of the topological features used to determine its identity (Diacritic Code 1).

FIG. 12 shows a diacritic for one embodiment and some of the topological features used to determine its identity (Diacritic Code 2).

FIG. 13 shows a diacritic for one embodiment and some of the topological features used to determine its identity (Diacritic Code 3).

FIG. 14 shows a diacritic for one embodiment and some of the topological features used to determine its identity (Diacritic Code 8).

FIG. 15 shows a diacritic for one embodiment and some of the topological features used to determine its identity (Diacritic Code 6).

FIG. 16 shows a diacritic for one embodiment and some of the topological features used to determine its identity (Diacritic Code 4).

FIG. 17 shows a diacritic for one embodiment and some of the topological features used to determine its identity (Diacritic Code 5).

DESCRIPTION OF THE PREFERRED EMBODIMENT

Introduction

Figure 1:
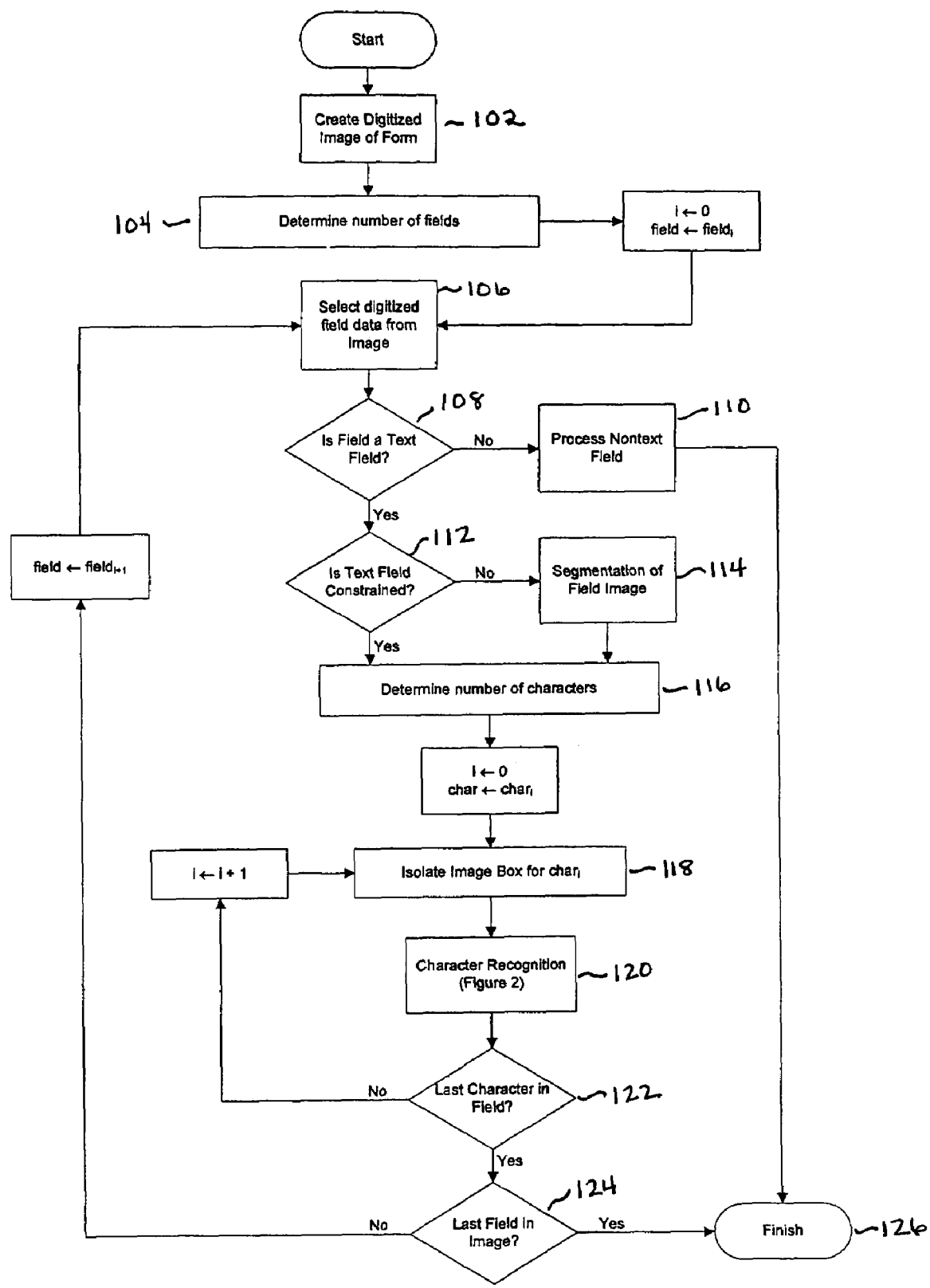
FIG. 1 shows the top-level flow of a method for optically recognizing a multi-language set of characters with diacritics.

The present invention relates to a method of identifying multi-language character sets through optical recognition. They are not numbers nor are they other characters or symbols such as a question mark, ampersand, or quotation mark. Optical recognition refers to a system and process whereby characters in a paper document are digitized, using such devices as a scanner or facsimile machine, and subsequently recognized as distinct computer-identifiable characters. The term Optical Character Recognition (OCR) is used mostly for recognition algorithms of machine printed text. Algorithms used for recognition of hand printed text are called Intelligent Character Recognition (ICR). ICR algorithms typically use artificial intelligence methods, such as neural networks, pattern recognition and fuzzy logic. Every character in every language can be encoded in nonvolatile computer memory as a binary data string. The binary data string corresponds to a given output, which is the character, and the computer is able to display the output, if so commanded, to an output medium. One of the major parameters of any ICR/OCR system is the number of output classes (symbols or characters). The number of output classes defines the complexity of the classifiers; i.e. the recognition algorithms, with a higher number increasing the error rates in recognition due to greater potential for confusion between symbols. For the alpha-based languages, the number of symbols may be in the range of 100-200. This can include characters with different diacritics. The present invention provides an integrated method for accurate and time effective recognition of the hand-printed text containing characters with diacritics based on the separate recognition of the various portions of the character, which results in a decreased number of output classes for the each classifier. Through accurate identification of diacritics, the recognizable character set increases and a computer is able to accurately recognize more computer-identifiable characters. The present invention significantly enhances recognition by incorporating into the recognition process a special diacritic identification algorithm that enables recognition of alpha characters from many of the world's languages. More particularly, the subject identification algorithm provides for separation, identification and subsequent matching of a diacritic relative to the corresponding base portion (Base) of the character.

All processes can be divided into the following major stages:

1. Image analysis of the character for strokes separation and extraction of the Base of the character image and diacritics.
2. Application of OCR/ICR to the Base.
3. Processing of the diacritic portion of the character with special image analysis and pattern recognition algorithms.
4. Combining the results of (2) and (3) to check for acceptable combinations for specific languages.

Stage 2 can be accomplish by any ICR/OCR algorithm, but for all other stages specific algorithms have been created that are essential parts of this invention and are critical for time effective, accurate recognition.

Top Level Flow

Referring to FIG. 1, the basic optical recognition process is shown for the preferred embodiment; optical recognition of a form document. A form document can be defined as a collection of rectangular, constrained (with boxed characters) and unconstrained text fields. Although processing of form documents is the main area for application of the present invention, it can also be integrated into systems for text recognition on maps, drawings, charts, or any other documents containing text.

A digitized image of the form data is created 102 using a scanner, facsimile machine or other device that converts paper or electronic text documents into digitized images. Selective portions of the form may be digitized through use of data capture software applications. Using this type of application, the data in the data fields is located and extracted for digitization. Form dimensions and field information are stored and a special algorithm is applied which locates data at known field locations.

After extraction and digitization, the form derivates into digitized data located in relative correspondence to their spatial relationship on the form. The data capture software applications are used to locate and select digitized field data from the image for subsequent recognition. Locating algorithms similar to the special algorithm described above can be used for this purpose.

The present embodiment is applicable only for text fields. The number of fields on the digitized image is determined 104. An iterative process is established so that each field in the image is looked at to see if it is a text field. Digitized field data from the image is selected 106 and a query 108 is made to see if the field is a text field. The data capture software application obtains this and other such information at the time of extraction from the electronic form and stores the information in computer memory. If the field is found not to be a text field, it is processed as a nontext field 110. If the field is a text field, another query is made to determine if the text field is constrained 112. A constrained text field is a field that confines the individual characters of the data to predetermined dimensional boundaries. Bounding of the individual characters is necessary to perform succeeding steps. Thus, if the data is obtained from a field that is not constrained, the field image is segmented 114. The segmentation process collects input variables from an image zone containing the data and based on those variables creates image boxes of a certain size and location. The image boxes are developed optimally to envelop each character of the data field. Regardless of how the boundaries are derived for the individual character images, the number of characters in the field are determined 116. The image box for the current character, started from the first character, is isolated 118. Character recognition 120 algorithms in this embodiment identify the digital character image as text by determining the standard code within a given code set, such as the American Standard Code for Information Interchange (ASCII), the set comprised by the American National Standards Institute (ANSI) or some other similar set of code. A query is performed to determine if the recognized character is the last in the field 122. A recursive loop ensures that each digitized character in the data field undergoes the same character recognition 120 process. After the last character in the field is recognized, a query is performed to determine if the field is the last field in the image 124. The process continues with the next data field in the digitized image. Recognition of the last character in the last data field concludes the recognition process. The entire process concludes at 126 with recognized text from any of a number of languages or recognized characters from nontext fields.

Character Recognition

Figure 2:
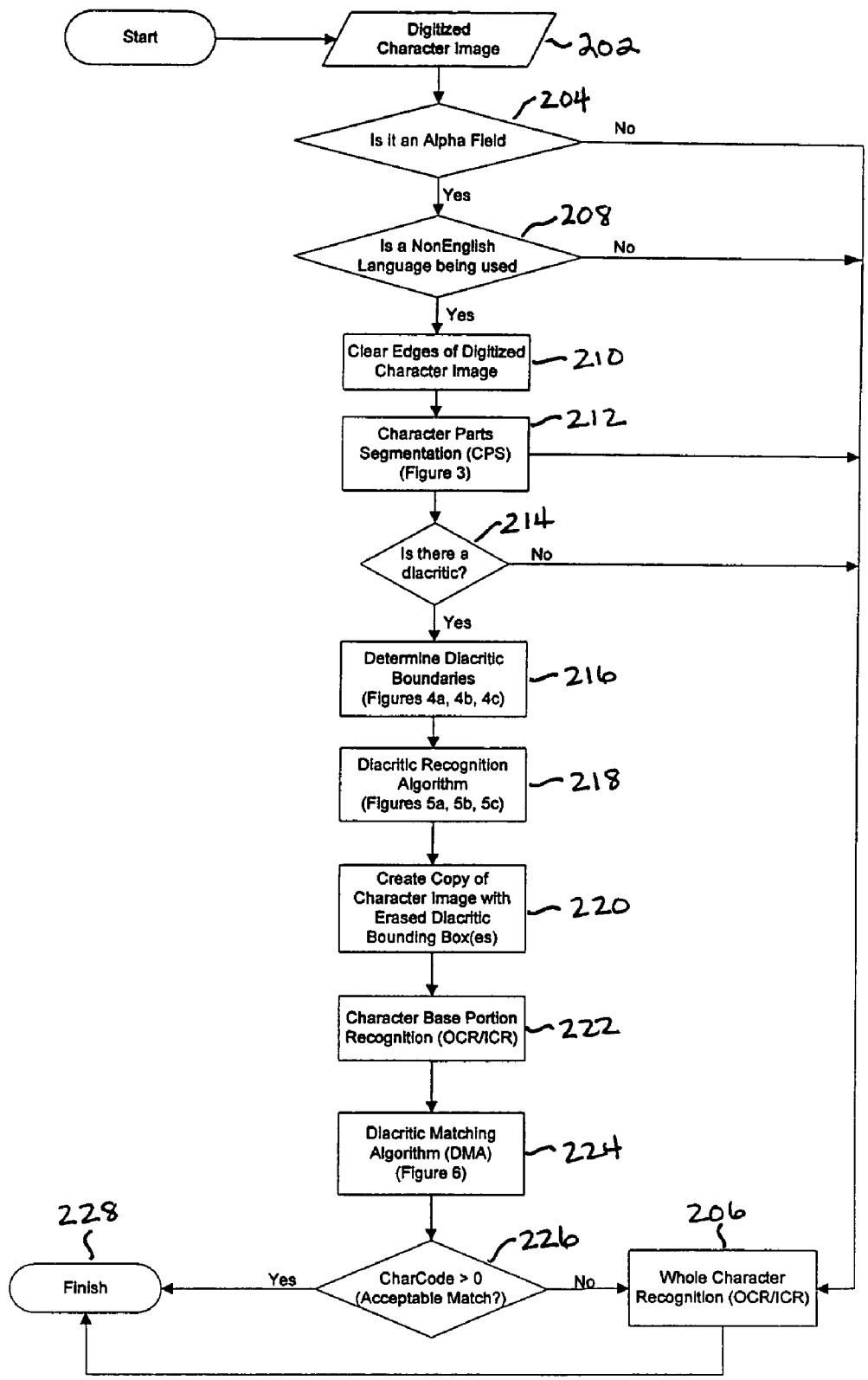
FIG. 2 shows the general flow depicting optical character recognition for all the characters of a digitized image.

In FIG. 1, the top-level flow of the recognition process was explained. FIG. 2 begins a more detailed look at recognition process of the individual characters.

A query is first made of the digitized character image 202 to determine if it was included in an alpha field 204. Form fields are generally defined as alpha, numeric, alphanumeric or some other designation. Defining the fields increases recognition accuracy by reducing the size of the output class. The smaller the output class, the less chance there is for error due to the reduced number of choices for the recognized character image. For example, similar characters such as oh (O) and zero (0), lowercase el (l) and one (1), or lowercase gee (g) and nine (9) are known to cause confusion. Therefore, in those cases, removing numbers as an output class will increase recognition accuracy. If the field is not an alpha field, whole character recognition 206 is performed per standard OCR or ICR recognition algorithms. The identification algorithms used in this invention are bypassed. If the field is identified as an alpha field, a second query 208 is made to determine if a non-English language is being used. Text from the English language does not utilize diacritics in its alphabet. Therefore, if the data field contains only English-language characters, there will be no diacritics and no need to access further processes of this invention. Thus, analysis and identification of the diacritic is bypassed and whole character (all pixels within the image box) recognition 206 is performed per standard OCR or ICR recognition algorithms. If the data field contains characters in a non-English language, a more detailed analysis of the character begins.

Noise and portions of adjacent character images are removed to better prepare the subject character image for recognition. This is done through a process that clears the edges of the digitized character image 210. By clearing the edges of the whole character image, noise (sporadic black pixels that are not part of the Base or diacritic) is removed. Adjacent character images may bleed into an adjacent bounding box due to sloppy printing or writing by the person filling out the form or due to imperfect segmentation. This can also be removed by clearing the edges of the digitized character images 210. Thus, the original image box is reduced so that only the character will be analyzed. Further noise within the image box will be removed through other processes described below.

A character parts segmentation 212 is performed to separate the Base of the whole character from the diacritic. If the diacritic consists of more than one distinct mark separated by white pixels, each mark will be isolated. A bounding box is constructed to encompass the Base and each mark of the diacritic. Each bounding box consists of a top edge, bottom edge, left edge and right edge to form a rectangular plane. Each edge is tangent to the most extreme pixel in the respective group of pixels that make up the Base or diacritic mark. The orientation of the encompassing rectangle is made to correspond with the orientation of the original form document. Greater detail of the character parts segmentation is depicted in FIG. 3.

Figure 3:
FIG. 3 shows the flow of the character parts segmentation process.
Figure 3A:
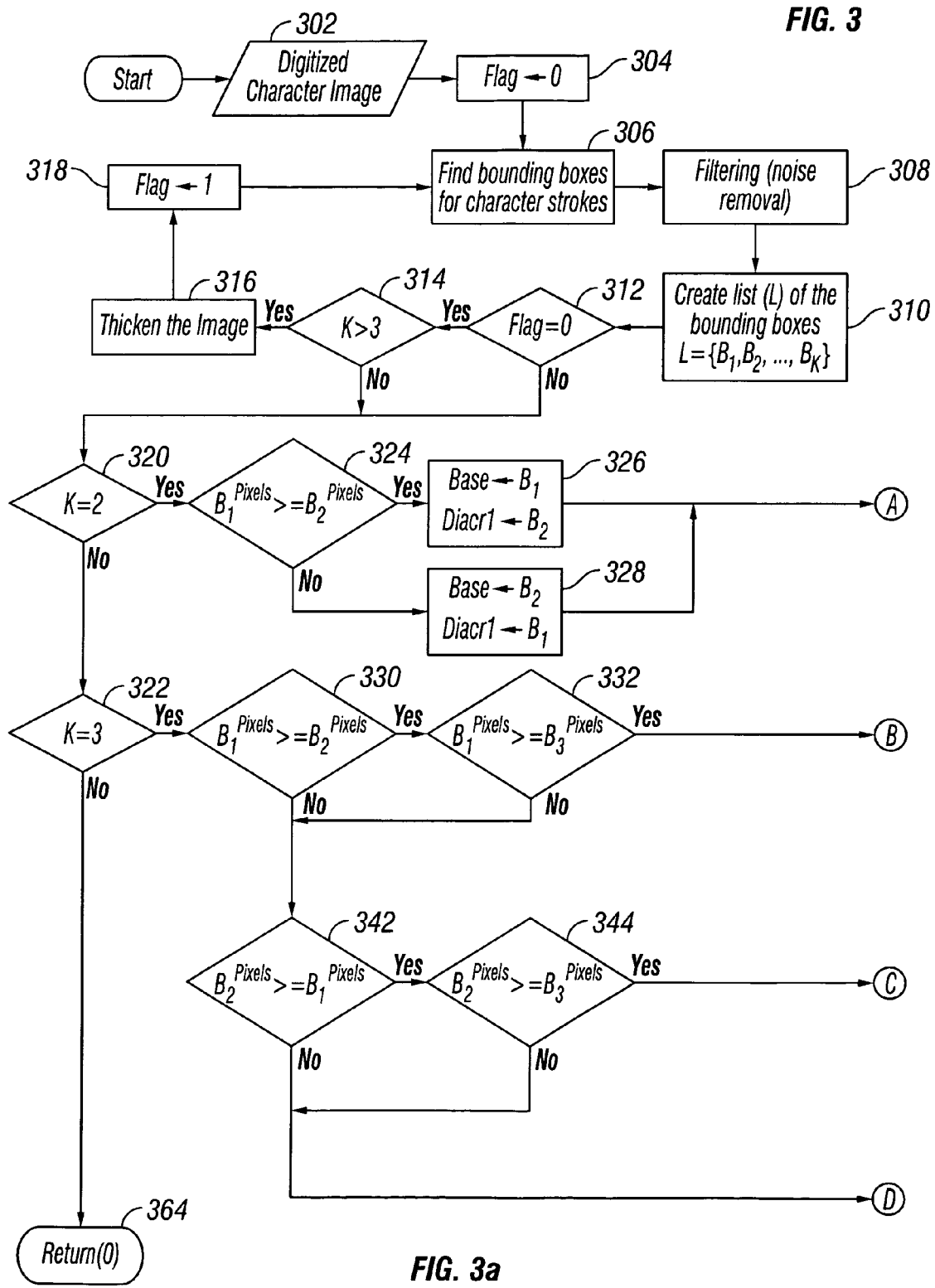
Figure 3B:
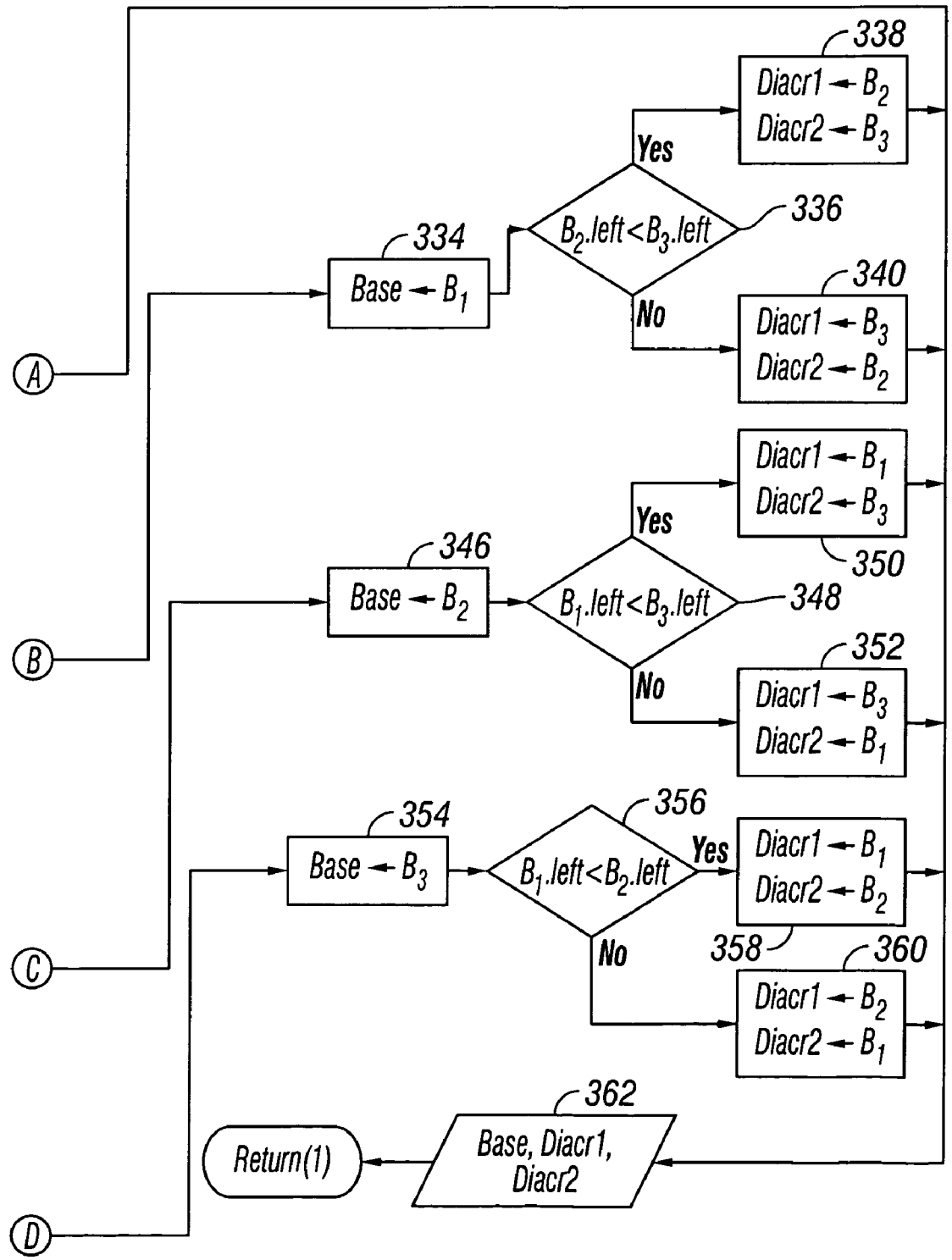

Referring to FIG. 3, the digitized character image 302 is received as input. A flag is set to zero 304 to control the process flow. The character parts segmentation of the character image 306 establishes bounding boxes about each pixel grouping and establishes a sequential list corresponding to the number of bounding boxes 310. In so doing, random isolated black pixels or specified minimal pixel groups (referred to as noise) are bypassed and therefore filtered out 308. The list at 310 shows bounding boxes 1 through K, where K represents the maximum number of bounding boxes. Since the flag was set to zero at 304, the decision box 312 establishes that flag equals zero and then queries at 314 for the number of bounding boxes established during character parts segmentation. If the number of bounding boxes exceeds three, it is known that there exist black pixels that are unconnected to either the Base or diacritic. Never should there be more than three bounding boxes in character parts segmentation of multi-language alpha characters. The Base of the character will always count as one bounding box and the diacritic, if one exists, will provide a count of one or two bounding boxes. In the present embodiment, no diacritic has more than two markings. Therefore, three bounding boxes is the maximum number possible. A number greater than three assumes pixels that are unconnected and nonadjacent to either the Base or diacritic but associated with one or the other. Therefore, these pixels are considered part of the Base or diacritic but due to certain inefficiencies in the optical recognition process they were recognized with space between them and the respective Base or diacritic. To correct this, a thickening process is performed on the character image 316. The thickening process inserts additional black pixels and places them adjacent existing black pixels at mathematically derived optimal locations to thicken the image. The desired result of this process in the present context is to join the surrounding black pixels that are unconnected and nonadjacent to their respective Base or diacritic. This being done, no more than three bounding boxes should thereafter exist. The flag is set to one 318 to prevent repeated thickening operations. Steps 306, 308 and 310 are repeated.

At 314, if the number of bounding boxes did not exceed three, queries are made at 320 and 322 to determine if there are two or three bounding boxes, respectively, or if there is only one. At 320, if the number of bounding boxes is two, a quantitative black pixel determination is made between the first and second bounding box 324. The bounding box containing the greater number of pixels is presumed to contain the character Base. This is a valid presumption since proper scripting of alpha characters always portrays a Base significantly larger than the diacritic. At 326, the bounding box with the greatest number of pixels is designated $B_1$ and is assigned to the Base. Since there are only two bounding boxes, the second bounding box contains the sole diacritic mark (Diacr1) and is assigned $B_2$. In the event $B_2$ has a greater pixel count than $B_1$, $B_2$ is assigned to the Base and $B_1$ is assigned to the diacritic 328.

At 322, if the number of bounding boxes is found to equal three, a comparative quantitative analysis is made between the pixel groupings in each of the three bounding boxes; similar to the analysis performed for the two bounding boxes, above. In one sequence, the first bounding box in list L, $B_1$, is compared against $B_2$ at 330 and $B_3$ at 332 to ensure it contains the greatest number of pixels. After affirmance, $B_1$ is assigned to the Base of the character 334. A query is made at 336 regarding the positioning of $B_2$ relative to $B_3$. The bounding box that is positioned furthest left (i.e. closest to the ordinate) is assigned to the first diacritic mark (Diacr1). The other bounding box is assigned to the second diacritic mark (Diacr2). This is shown at 338 and 340. In another sequence, the second bounding box in sequential list L, $B_2$, is compared against $B_1$ at 342 and $B_3$ at 344 to ensure it contains the greatest number of pixels. After affirmance, $B_2$ is assigned to the Base of the character 346. Similar to the sequence above, a query is made at 348 regarding the positioning of $B_1$ relative to $B_3$. The bounding box that is positioned furthest to the left is assigned to Diacr1 and the one not so positioned is assigned to Diacr2. This is shown at 350 and 352. If neither first nor second bounding box contains the greatest number of pixels, than by process of elimination the third bounding box in the sequential list, L, $B_3$ is assigned to the Base 354. A comparison of positions is performed between bounding box one and bounding box two 356. The one positioned furthest left is assigned Diacr1, and the other is assigned Diacr2. This is shown at 358 and 360.

Whatever path is taken, the various boundary boxes are defined for the Base, and each of the diacritic marks. The definitions will be used as output data 362 for determining the-diacritic boundaries. If only two boxes are established through character parts segmentation 306, then the second diacritic mark, Diacr2, will receive a null Code.

Above, it was noted that the number of bounding boxes could be one. This will occur when no diacritic is found during character parts segmentation 306. The queries at 320 and 322 will be negative causing a return value of zero 364. This will cause the diacritic recognition algorithm to be bypassed thus providing only typical recognition through OCR or ICR recognition. Furthermore, the number of bounding boxes could exceed three, but due to a flag assignment of one at 318, a repeat of the thickening process is bypassed and the process flow proceeds to determine if there are two bounding boxes 320 or three bounding boxes 322. This situation occurs when the thickening process at 316 was unsuccessful in its purpose during the first loop. As with the situation where there is only one bounding box, the queries to determine if there are two or three bounding boxes will be negative. The best chance for character recognition in this instance is to invoke a return value of zero and proceed with typical OCR or ICR recognition.

Referring again to FIG. 2, many non-English alpha characters do not contain a diacritic. Character parts segmentation 212 determines if the subject alpha character contains a diacritic. If the character parts segmentation did not detect a diacritic 214, no labels are assigned and, as described in FIG. 3 and shown in FIG. 2, a return value of zero is invoked and the character proceeds to whole character recognition 206 for typical OCR or ICR recognition. When a diacritic is found through character parts segmentation 212, the information found during that process is used to determine diacritic boundaries 216.

Determining Diacritic Boundaries

The boundaries of the diacritic are determined by establishing a Rectangle of Interest (ROI) about the diacritic. The ROI is a rectangular region that envelops the diacritic image. It is established as a preliminary series of steps in the diacritic recognition algorithm and its geometry is used to assist in diacritic identification. The boundaries are positioned at the extremities of the diacritic mark. Planar axes are consistent with the axes of the form from which the diacritic originated. When the diacritic consists of two separate marks, the width of the ROI must equal the maximum combined diacritic width. This can be seen in FIG. 8 along with the given orientation.

Referring to FIG. 4a, the Base, Diacr1, and Diacr2 bounding boxes are received as input 402. The location for the top of the Base, i.e. the pixel closest the abscissa, is determined at 404. This feature is used to help establish the ROI. FIG. 4a depicts the steps necessary to establish the ROI boundaries for a single mark diacritic when a second mark is detected as noise. The single mark is in this instance is the mark positioned furthest to the right (Diacr2); i.e. having a midpoint furthest from the ordinate. It is assessed as a diacritic mark when it meets the condition that it is greater than four pixels 406 and when none of those pixels extend into the vertical limits of the Base 408. A check is made to ensure that the other detected mark is noise. This occurs by determining that the pixel count is less than four 410. A grouping of four pixels or less is considered noise in the present embodiment. However, if the noise should extend into the vertical limits of the Base, it is assumed to be part of the Base and ignored 412. The ROI parameters; the left, right, top and bottom edges, and the pixel count, using Diacr2, only, are calculated and assigned labels 414. If any of the above conditions are negative, analysis of Diacr1 as a single mark diacritic is performed. The steps of this analysis are shown in FIG. 4b.

Referring to FIG. 4b, the ROI boundaries are established for a single mark diacritic regardless of whether a second mark is detected as noise. If noise is detected, as between the noise and the single diacritic mark, the mark is positioned furthest to the left (Diacr1). First, the diacritic mark must meet conditions similar to those above. It must possess greater than four pixels 416 and none of those pixels must extend into the vertical limits of the Base 418. A check is made at 420 to ensure that the other detected mark is noise. If the detected noise extends into the vertical limits of the Base, it is assumed to be part of the Base and ignored 422. The ROI parameters; the left, right, and top edges, and the pixel count, using Diacr1, only, are calculated and assigned labels 424. The bottom edge is determined by comparing the bottom edge of Diacr1 against the top of the Base. As between those two edges, the edge closest to the abscissa; i.e. the minimum edge, is assigned as the ROI bottom edge 426.

If the conditions above, establishing Diacr2 or Diacr1 as a singular diacritic mark, are not met, the ROI parameters are established for a diacritic having two marks. Referring to FIG. 4c, Diacr1 is queried to determine if it consists of more than four pixels 428. Next, it is verified that the pixels of Diacr1 do not extend into the vertical limits of the Base 430. Diacr2 then undergoes the same inspection. If it consists of more than four pixels 432 and does not extend into the vertical limits of the Base 434, the ROI parameters are calculated and assigned. The number of pixels contained within the ROI, DiacrPixels, is equivalent to the sum of the pixels of Diacr1 and Diacr2 436. The left edge of ROI, DiacrROI.left, is the edge tangent to the diacritic pixel closest the ordinate 438. This is most likely Diacr1 since its midpoint is closest to the ordinate. However, with a two mark diacritic, Diacr2 could feasibly extend beyond the left edge of Diacr1. The right edge of ROI, DiacrROI.right, is similarly determined 440. However, this edge would coincide with the pixel furthest from the ordinate. The top edge of the ROI, DiacrROI.top, is determined by finding the pixel located closest to the abscissa 442. This pixel would possess the minimum horizontal value for this embodiment. The bottom edge of the ROI, DiacrROI.bottom, is the edge tangent the pixel furthest from the abscissa. However, since this edge is in closest proximity to the Base, should that edge extend past the edge established at the top of the Base, the top of the Base edge is made DiacrROI.bottom 444.

Once the top and bottom edges of the ROI are calculated, the height of the diacritic is obtained 446. If at 448 the diacritic height, DiacrHeight, is found to be less than one pixel in height, the ROI cannot be analyzed by the diacritic recognition algorithm and a return of zero is invoked 450. Identification of the diacritic will cease and whole character recognition will be implemented using typical OCR or ICR recognition algorithms. If DiacrHeight is not less than one, the ROI definitions are received as output at 452 and a return of one is given. This represents a continuation of the diacritic identification process using the diacritic recognition algorithm 218.

Identification of the Diacritic

The ROI is defined above. The area defined by the ROI encompasses the diacritic in an established manner that creates a condition suitable for identification analysis. It should be noted here that if the particular diacritic being recognized only contains one diacritic mark, Diacr2 will be null in the above steps. However, this will not affect the process, only the variable assignments and the establishment of the ROI.

Figure 5B:
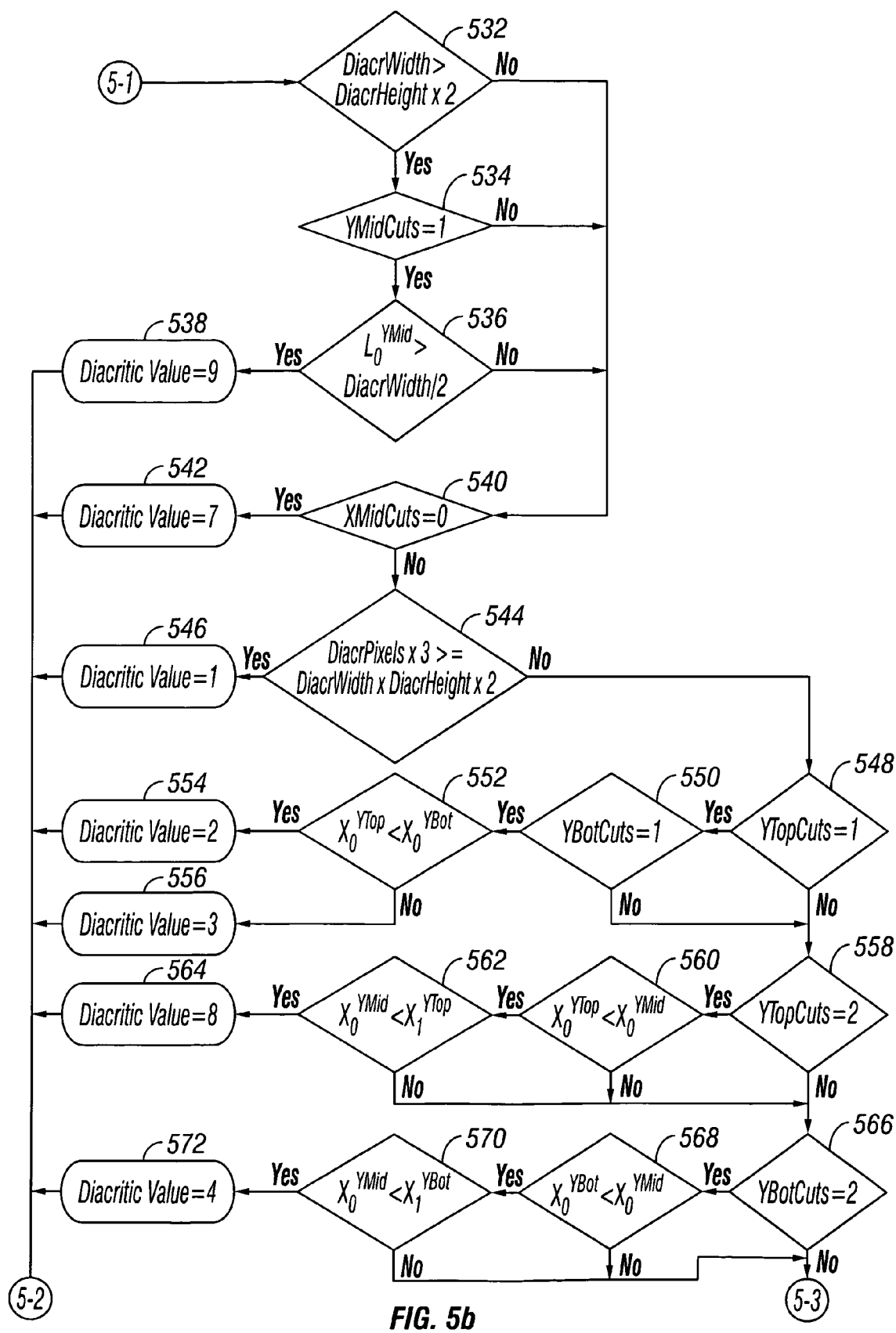
Figure 5C:
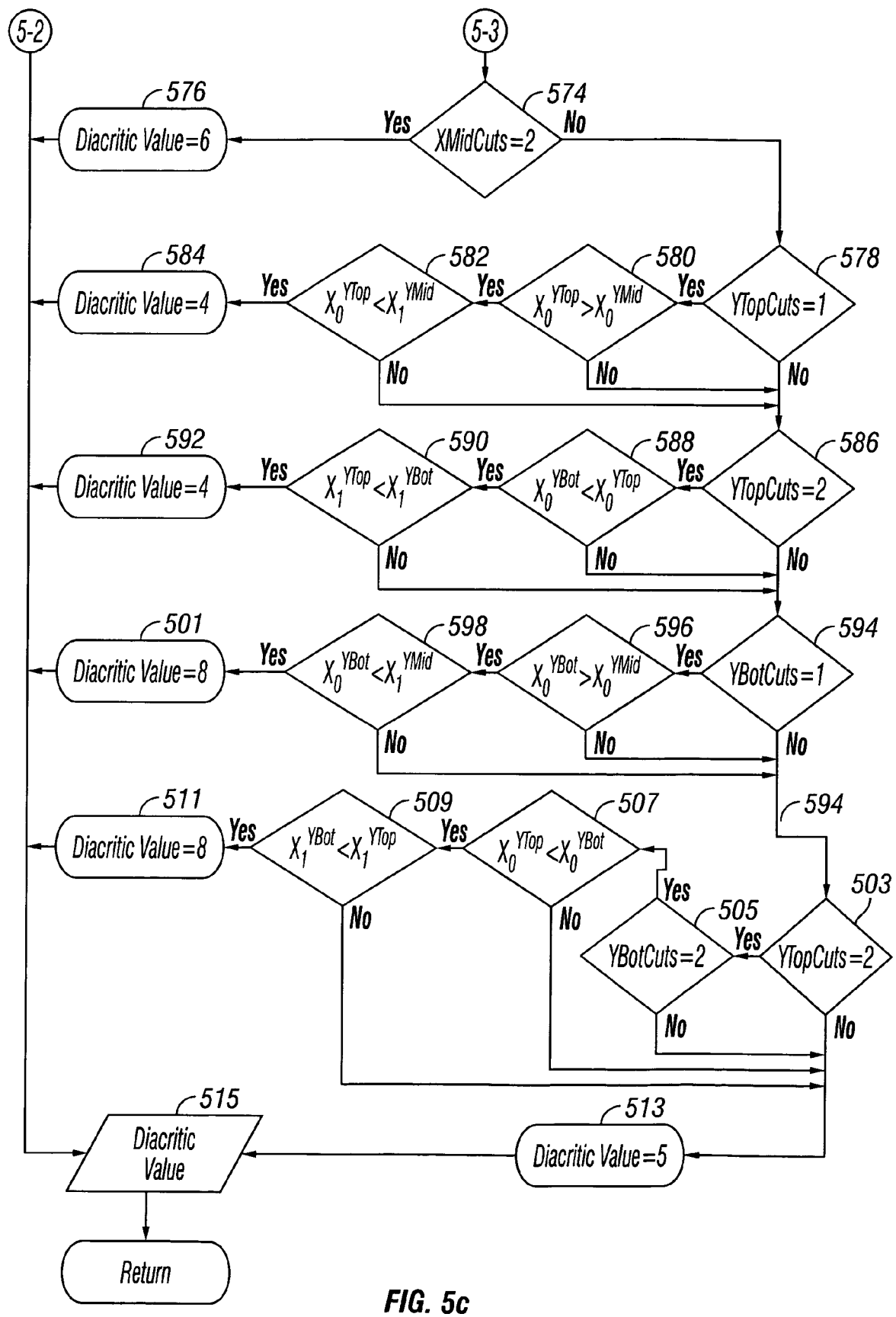

Identification of the diacritic is depicted in FIGS. 5a-5c. Certain variables are defined based on the geometric configuration of the ROI and the diacritic mark or marks enclosed therein. Referring to FIG. 5a, the ROI is received as input 502. The width of the ROI, which is essentially the width of the diacritic (DiacrWidth), is defined at 504. The ROI height, also essentially the diacritic height (DiacrHeight) is defined at 506. When the diacritic consists of two separate marks, the ROI must equal the maximum combined diacritic width. This can be seen in FIG. 9 which depicts the diaresis diacritic; a two mark diacritic. The planar midsections of the ROI are defined as points XMid and YMid at 508 and 510, respectively. A vertical line, relative to the planar establishment of the ROI, is made to bisect the ROI at the defined XMid point to attain the number and location of the intersections 510 through the diacritic image. The diacritic image needed to perform this step is obtained through a process described in detail below and shown in this FIG. 5a as GetImageRuns 514. A bisecting line is input and placed at XMid through the diacritic accessible through GetImageRuns 514. The output, the number of intersections (XMidCuts), and the location of those intersections ($Y_0^{XMid}, Y_1^{XMid}, \ldots$) are received as output at 510. A similar analysis is made at 516 for a bisection of the diacritic image at YMid. Further output is received which represents the pixel length of the first intersective cut at YMid ($L_0^{YMid}$). This information is needed in the diacritic recognition algorithm to help identify the horizontal bar diacritic (Reference FIG. 10) which is included in this embodiment.

The diacritic image obtained by GetImageRuns has varying pixel thickness at any given cross-section of the ROI. Thus, at XMid and YMid, there is a given pixel thickness. The intersection points obtained at XMid and YMid by the above steps is defined by the mid-pixel along the intersective length. This is seen in FIGS. 9-17, which are examples of certain diacritic images and their respective geometric definitions.

Definitions of diacritic image geometry have been established through the X and Y midsections of the ROI. For greater accuracy in identification of the diacritic image, similar geometric identifications must be made along other cross-sections of the diacritic image. For the present embodiment, those cross-sections are along the established Y axis and are made relative to the top and bottom edges of the ROI. Through quantitative and qualitative analysis it has been determined that a cross-section established from the top edge (YTop) as well as the cross-section established for the bottom edge (YBot), aid in identification of the diacritic image best if they are made within a two pixel span from the top and bottom edge; unless the DiacrHeight spans less than eight pixels. In such an instance, the best assessment of diacritic image identification is made when YTop and YBot are made at a one-pixel distance from the top and bottom edges, respectively. If DiacrWidth is greater than eight pixels, the YTop and YBot cross-sections are established at a two pixel difference from the top and bottom edges of the ROI, respectively. If DiacrWidth is not greater than eight pixels, the cross-sections are established at a one-pixel difference. To establish this, DiacrWidth pixel span is determined at 518. If pixel span is greater than eight, the distance (dY) from top and bottom ROI edges is assigned a value of two pixels 520. If the pixel span is not greater than eight, the distance is assigned a value of one pixel 522. Once the best distance is determined for the given DiacrHeight of the diacritic image, cross-sectional slices YTop and YBot are made. Again, these slices are made a distance dY from the top edge of ROI, as shown at 524, and a distance of dY from the bottom edge of the ROI, as shown at 528.

With the established cross-sections, geometric features of the diacritic image are obtained similar to the geometric features found using YMid. At 526 and 530, horizontal lines corresponding to YTop and YBot are run through the diacritic image accessed via GetImageRuns 514 to obtain the number and location of all intersections. The locations of the intersections made between the cross-sections and the diacritic image are determined using the mid-pixel along the intersective length (Reference FIGS. 9-17).

The cross-sectional cuts of ROI established sufficient geometrical definition to identify the diacritic image. The remaining steps assess the geometry and, based on that assessment, assign a Code corresponding to a given diacritic.

Referring to FIG. 5b, DiacrWidth is compared against DiacrHeight 532. If DiacrWidth is more than twice as great as DiacrHeight, a determination is made to see if there was only one intersection at YMid 534. If this is true, a final determination is made to see if the intersective length of the cross section at YMid exceeds half the value of DiacrWidth 536. This geometry described by positive indications to all of the above queries indicates a long, thin shape. Such a shape most resembles the horizontal bar (see FIG. 10). A diacritic Code of nine is given 538.

A negative indication to any or all of the three queries eliminates the horizontal bar as the subject diacritic. A new query is made to determine if the number of intersections made by the cross-section at XMid (XMidCuts) equals zero 540. If there is a positive indication a diacritic Code of seven is assigned 542. This Code corresponds to the diaresis diacritic (Reference FIG. 9), which typically has no pixels at the central portion of the ROI and therefore nothing to intersect. XMidCuts will return a value of zero. A negative indication opens a query that performs a comparative area calculation; three times the number of pixels of the diacritic relative to twice the area of the ROI 544 where the unit of length equals the length of a pixel. If three times the pixel area exceeds twice the ROI area, a diacritic Code of one is assigned 546. This Code corresponds to the "above dot" (Reference FIG. 11). A dot typically generates an area that if tripled will exceed the twice the area of a rectangle that envelops it. The rectangle in this instance is the ROI. A negative indication culminates into a series of further geometric inquiries. A diacritic Code of two is assigned 554 when there is only one intersection at the cross-section defined by YTop 548, only one intersection at the cross-section defined by YBot 550, and the location of the intersective midpoint along the cross-section at YTop is closer to the ordinate than the location of the intersective midpoint along the cross-section at YBot 552. The grave accent diacritic (Reference FIG. 12) is the only diacritic in the present embodiment that will have only one intersection at each of the horizontal cross-sections and the orientation described by the midpoints of those top and bottom intersections. If the first two conditions are positive but the location of the intersective midpoints are reversed, i.e. the intersective midpoint at YTop is further from the ordinate and the intersective midpoint at YBot is closer to the ordinate, then the orientation of the diacritic is reversed. This geometry corresponds to the "acute accent" (Reference FIG. 13). A diacritic Code of three is assigned 556. If either of the first two queries is negative, other geometric comparisons are considered. A diacritic Code of eight is assigned 564 when the following conditions are met: (1) there are two intersections between the diacritic image and the cross-section at YTop 558, (2) the location of the intersective midpoint along the YTop cross-section at the first intersection is closer to the ordinate than the location of the intersective midpoint along the YMid cross-section at the first intersection 550, and (3) the location of the intersective midpoint along the YMid cross-section at the first intersection is closer to the ordinate than the location of the intersective midpoint along the YTop cross section at the second intersection 552. A diacritic Code of eight corresponds to the "caron" diacritic (Reference FIG. 14). If any of these conditions are not met, a new set of conditions that essentially mirror the conditions for the "caron" diacritic are assessed. A diacritic Code of four 572 is given when these conditions are met: (1) the number of intersections between the diacritic image and the cross-section at YBot is two 566, (2) the location of the intersective midpoint at the first intersection of the cross-section at YBot is closer to the ordinate than the location of the intersective midpoint at the first intersection of the cross-section at YMid, and (3) the location of the intersective midpoint at the first intersection of the cross-section at YMid is closer to the ordinate than the location of the intersective midpoint at the second intersection of the cross-section at YBot. The mirror image of the "caron" diacritic and the diacritic described by the above geometry is the "circumflex" diacritic. If any of the conditions are not met, the process looks at new set of conditions for further diacritic identification.

Information from the above set of conditions flow down to subsequent sets of conditions. Therefore, subsequent to the first set of conditions for establishment of diacritic Code nine 538, certain geometries or geometric combinations are dispelled. A later set of conditions impliedly relies on that information in assigning their respective diacritic Codes.

If the intersections created by the bisection at XMid equals two 574, a diacritic Code of six is assigned 576. The only diacritic in the present embodiment that has two intersections along the bisecting cross-section at XMid is the "ring" diacritic (Reference FIG. 15). If there are not two intersections along XMid, the following conditions must be met for an assignment of diacritic Code four 584: (1) the number of intersections created by the cross-section at YTop equals one 578, (2) the location of the intersective midpoint at the first intersection of the cross-section at YTop is further from the ordinate than the location of the intersective midpoint at the first intersection of the cross-section at YMid, and (3) the location of the intersective midpoint at the first intersection of the cross-section at YTop is closer to the ordinate than the location of the intersective midpoint at the second intersection of the cross-section at YMid. This geometry also describes the "circumflex" diacritic (Reference FIG. 16). Unlike the previously described set of conditions, this geometry describes the "circumflex" diacritic better when, due to an imprecise marking by the printer of the diacritic, two intersective cuts cannot be made at YTop. A diacritic Code of four is also assigned 592 if the following conditions are met: (1) the number of intersections created by the cross-section at YTop equals two 586, (2) the location of the intersective midpoint at the first intersection of the cross-section at YBot is closer to the ordinate than the location of the intersective midpoint at the first intersection of the cross-section at YTop 588, and (3) the location of the intersective midpoint at the second intersection of the cross-section at YTop is closer to the ordinate than the location of the intersective midpoint at the second intersection of the cross-section at YBot 590. These conditions are assessed after the other sets of conditions for the "circumflex" diacritic. The conditions are only met when the angle between the two legs of the diacritic is relatively large and/or the pixel thickness is very thin. A diacritic Code of eight is assigned 501 if these conditions are met: (1) the number of intersections created by the cross-section at YBot equals one 594, (2) the location of the intersective midpoint at the first intersection of the cross-section at YBot is further from the ordinate than the location of the intersective midpoint at the first intersection of the cross-section at YMid 596, and (3) the location of the intersective midpoint at the first intersection of the cross-section at YBot is closer to the ordinate than the location of the intersective midpoint of the second intersection at the cross-section at YMid 598. This geometry also describes the "caron" diacritic (Reference FIG. 14). Unlike the previously described set of conditions, this geometry describes the "caron" diacritic better when, due to an imprecise marking by the printer of the diacritic, two intersective cuts cannot be made at YBot. A diacritic Code of eight is also assigned 511 if these conditions are met: (1) the number of intersections created by the cross-section at YTop equals two 503, (2) the number of intersections created by the cross-section at YBot equals two 505, (3) the location of the intersective midpoint at the first intersection of the cross-section at YTop is closer to the ordinate than the location of the intersective midpoint at the first intersection of the cross-section at YBot 507, and (4) the location of the intersective midpoint at the second intersection of the cross-section at YBot is closer to the ordinate than the location of the intersective midpoint at the second intersection of the cross-section at YTop. Similar to the "circumflex" above, the "caron" diacritic described by this set of conditions has a relatively large angle between its legs and/or the pixel thickness of the legs is very thin.

By default, if no diacritic Code is assigned after assessing all of the above sets of conditions, a diacritic Code of five is assigned 513. This Code corresponds to the "tilde" diacritic (Reference FIG. 17). The diacritic Code is received as output at 515 and later used in the diacritic matching algorithm 224.

The following table shows the relationship between the geometric parameters and the diacritic Code assignments:

Diacritic Matching Algorithm

Referring once again to FIG. 2, after the diacritic is recognized with the diacritic recognition algorithm, a copy of the character image is created with the diacritic bounding boxes erased 220. Recognition of the Base of the character is then performed 222 using OCR or ICR recognition algorithms. After recognition of both the Base and diacritic, a diacritic matching algorithm 224 is implemented. The diacritic matching algorithm increases recognition accuracy by ensuring that only those diacritic-Base combinations that actually exist for a particular language are recognized. Furthermore, certain incorrect combinations can also be corrected when the recognized Base is an incorrectly recognized character that is a consistent misrecognition of a character that properly combines with the recognized diacritic. Because of this, the diacritic matching algorithm has the indirect affect of increasing Base accuracy as well as diacritic recognition.

The diacritic matching algorithm is depicted in detail in FIG. 6 and the acceptable matching combinations between the Base and diacritic are shown below:

Language Code (LangBit)
RELANG_ENGLISH=0x00000001,
RELANG_GERMAN=0x00000002,
RELANG_FRENCH=0x00000004,
RELANG_SPANISH=0x00000008,
RELANG_ITALIAN=0x0000000,
RELANG_SWEDISH=0x00000020,
RELANG_NORWEGIAN=0x00000040,
RELANG_DUTCH=0x00000080,
RELANG_FINNISH=0x00000 100,
RELANG_DANISH=0x00000200,
RELANG_PORTUGUESE=0x00000400,
RELANG_SCANDINAVIAN=0x00000800,
RELANG_EUROPEAN=0x00001000,

| Diacritic Code | 9 | 7 | 1 | 2 | 3 | 8 | 4 | 6 | 4 | 4 | 8 | 8 | 5 |
|---|---|---|---|---|---|---|---|---|---|---|---|---|---|
| $DW > DH*2$ | X | | | | | | | | | | | | |
| $YMC = 1$ | X | | | | | | | | | | | | |
| $L_0^{YMid} < DW/2$ | X | | | | | | | | | | | | |
| $XMC = 0$ | | X | | | | | | | | | | | |
| $Pix*3 > (DW*DH*2)$ | | | X | | | | | | | | | | |
| $YTC = 1$ | | | | X | X | | | X | | | | | |
| $YBC = 1$ | | | | X | X | | | | | X | | | |
| $X_0^{YTop} < X_0^{YBot}$ | | | | X | | | | | | | | | |
| $X_0^{YTop} > X_0^{YBot}$ | | | | | X | | | | | | | | |
| $YTC = 2$ | | | | | | X | | | X | | X | | |
| $X_0^{YTop} < X_0^{YMid}$ | | | | | | X | | | | | | | |
| $X_0^{YMid} < X_1^{YTop}$ | | | | | | X | | | | | | | |
| $YBC = 2$ | | | | | | | X | | | | X | | |
| $X_0^{YBot} < X_0^{YMid}$ | | | | | | | X | | | | | | |
| $X_0^{YMid} < X_1^{YBot}$ | | | | | | | X | | | | | | |
| $XMC = 2$ | | | | | | | | X | | | | | |
| $X_0^{YTop} > X_0^{YMid}$ | | | | | | | | | X | | | | |
| $X_0^{YTop} < X_1^{YMid}$ | | | | | | | | | X | | | | |
| $X_0^{YBot} < X_0^{YTop}$ | | | | | | | | | | X | | | |
| $X_1^{YTop} < X_1^{YBot}$ | | | | | | | | | | X | | | |
| $X_0^{YBot} > X_0^{YMid}$ | | | | | | | | | | | X | | |
| $X_0^{YBot} < X_1^{YMid}$ | | | | | | | | | | | X | | |
| $X_0^{YTop} < X_0^{YBot}$ | | | | | | | | | | | | X | |
| $X_1^{YBot} < X_1^{YTop}$ | | | | | | | | | | | | X | |

DW = DiacrWidth
DH = DiacrHeight
YMC = YMidCuts
XMC = XMidCuts
YTC = YtopCuts
YBC = YBotCuts
Pix = Black Pixels RELANG_ENGLISH_UK=0x00002000,
RELANG_ENGLISH_AUS=0x00004000,
RELANG_LITHUANIAN=0x00008000,
RELANG_POLISH=0x00010000,
RELANG_TURKISH=0x00020000,
RELANG_CZECH=0x00040000,
RELANG_RUSSIAN=0x00080000,
RELANG_UKRAINLKN=0x00100000,
RELANG_ALL=0x001FFFFF Language Subset, Base Code, Diacritic Code, Character Code {$T_i^{lang}$, BaseCode, DiacrCode, Character Code}

```
{0x001FFFFF,105,1,105}, {0x001DFFFF,73,1, 73}, // i  I  except Turkish
{0x00020000,73,1,221}, // I-dot Turkish
{0x001FFFFF,108,1,105},              // 1-i
{0x001FFFFF, 49,1,105},              // 1-i
{0x00000120, 97,1,229}, {0x00000120,65,1,197}, // a  A  ring Swedish, Finnish
{0x00010000,122,1,191}, {0x00010000,90,1,175}, // z  Z  Polish
 // Grave\ (à..)
{0x00000494, 97,2,224}, {0x00000404,65,2,192}, // a  A
{0x00000494, 81,2,224},              // Q-a
{0x00000494, 71,2,224},              // G-a
{0x00000120, 97,2,229}, {0x00000120,65,2,197}, // a  A  ring Swedish, Finnish
{0x00000414,101,2,232}, {0x00000404,69,2,200}, // e  E
{0x00000414,108,2,232},              // 1-e
{0x00000490,111,2,242}, {0x00000490,79,2,210}, // o  O
{0x00000490, 48,2,242},              // 0-o
{0x00000014,117,2,249}, {0x00000004,85,2,217}, // u  U
{0x00000014,118,2,249}, {0x00000004,86,2,217}, // v-u V-U
{0x00000010,105,2,236},              // i I
{0x00000010,108,2,236},              // 1-i
{0x00000010, 49,2,236},              // 1-i
{0x00020000,73,2,221}, // I-dot Turkish
 // Acute/ (á..)
{0x00040418, 97,3,225}, {0x00040408,65,3,193}, // a  A
{0x00040418, 81,3,225},              // Q-a
{0x00040418, 71,3,225},              // G-a
{0x00000120, 97,3,229}, {0x00000120,65,3,197}, // a  A  ring Swedish, Finnish
{0x0004069C,101,3,233}, {0x0004061C,69,3,201 }, // e  E
{0x0004069C,108,3,232},              // 1-e
{0x00050618,111,3,243}, {0x00050608,79,3,211}, // o  O
{0x00050618, 48,3,243},              // 0
{0x00040418,117,3,250}, {0x00040408,85,3,218}, // u  U
{0x00040418,118,3,250}, {0x00040408,86,3,218}, // v-u V-U
{0x00000010, 79,3,243},              // O    only Italian
{0x00000010, 85,3,250},              // U    only Italian
{0x00000010, 86,3,250},              // V-U    only Italian
{0x00040000,121,3,253}, // y  Y
{0x00000418,105,3,237}, {0x00000408,73,3,205}, // i  I
{0x00000418,108,3,237},              // 1-i
{0x00000418, 49,3,237},              // 1-i
{0x00020000,73,3,221}, // I-dot Turkish
{0x00010000, 99,3,230}, {0x00010000,67,3,198}, // c  C  Polish
{0x00010000,110,3,241}, {0x00010000,78,3,209}, // n  N  Polish
{0x00010000,115,3,156}, {0x00010000,83,3,140}, // s  S  Polish
{0x00010000,122,3,159}, {0x00010000,90,3,143}, // z  Z  Polish
 // Circumflex /\ (â..)
{0x00020404, 97,4,226}, {0x00020404,65,4,194}, // a  A
{0x00020404, 81,4,226},              // Q-a
{0x00020404, 71,4,226},              // G-a
{0x00000404,101,4,234}, {0x00000404,69,4,202}, // e  E
{0x00000404,111,4,244}, {0x0000000C04,79,4,212}, // o  O
{0x00020004,117,4,251}, {0x00020004,85,4,219}, // u  U
{0x00020004,118,4,251}, {0x00020004,86,4,219}, // v-u V-U
{0x00020014,105,4,238}, {0x00020004,73,4,206}, // i  I
{0x00020014,108,4,238},              // 1-i
{0x00020014, 49,4,238},              // 1-i
 // Tilde (ñ..)
{0x00000008,110,5,241}, {0x00000008,78,5,209}, // n  N
{0x00000400,111,5,245}, {0x00000400,79,5,213}, // o  O
{0x00000400, 97,5,227},     {0x00000400,65,5,195}, // a  A
{0x00000400, 81,5,227},              // Q-a
{0x00000400, 71,5,227},              // G-a
 // Ring (å..)
{0x00000360, 97,6,229}, {0x00000360,65,6,197}, // a  A
{0x00040000,117,6,249}, {0x00040000,85,6,217}, // u  U  CZECH
 // Dieresis (ä..)
{0x000001A2, 97,7,228}, {0x000001A2,65,7,196}, // a  A
{0x000001A2, 81,7,228},              // Q-a
{0x000001A2, 71,7,228},              // G-a
{0x00000084,101,7,235 }, {0x00000004,69,7,203}, // e  E
{0x000201A2,111,7,246}, {0x000201A2,79,7,214}, // o  O
{0x0002048E,117,7,252}, {0x0002048E,85,7,220}, // u  U
{0x0002048E,118,7,252}, {0x0002048E,86,7,220}, //v-u V-U
{0x00000094,105,7,239}, {0x00000004,73,7,207}, // i  I
{0x00000090, 73,7,239},              // I Dutch and Italian
{0x00000094,108,7,239},              // 1-i
{0x00000094, 49,7,239},              // 1-i
 // Caron - Breve \/
{0x00020000,103,8,240}, {0x00020000, 71,8,208}, // g  G  Turkish
{0x00040000, 67,8,200}, {0x00040000, 99,8,232}, // C  CZECH
{0x00040000, 68,8,207}, {0x00040000,100,8,239}, // D  CZECH
{0x00040000, 69,8,204}, {0x00040000,101,8,236}, // E  CZECH
{0x00040000, 78,8,210}, {0x00040000,110,8,242}, // N  CZECH
{0x00040000, 82,8,216}, {0x00040000,114,8,248}, // R  CZECH
{0x00040000, 83,8,138}, {0x00040000,115,8,154}, // S  CZECH
{0x00040000, 84,8,141}, {0x00040000,116,8,157}, // T  CZECH
{0x00040000, 90,8,142}, {0x00040000,122,8,158}, // Z  CZECH
 // Confusing Caron - Breve \/ or Dieresis
{0x00020000,103,9,240}, {0x00020000, 71,9,208}, // g  G  Turkish
{0x00000} };
```

Figure 6:
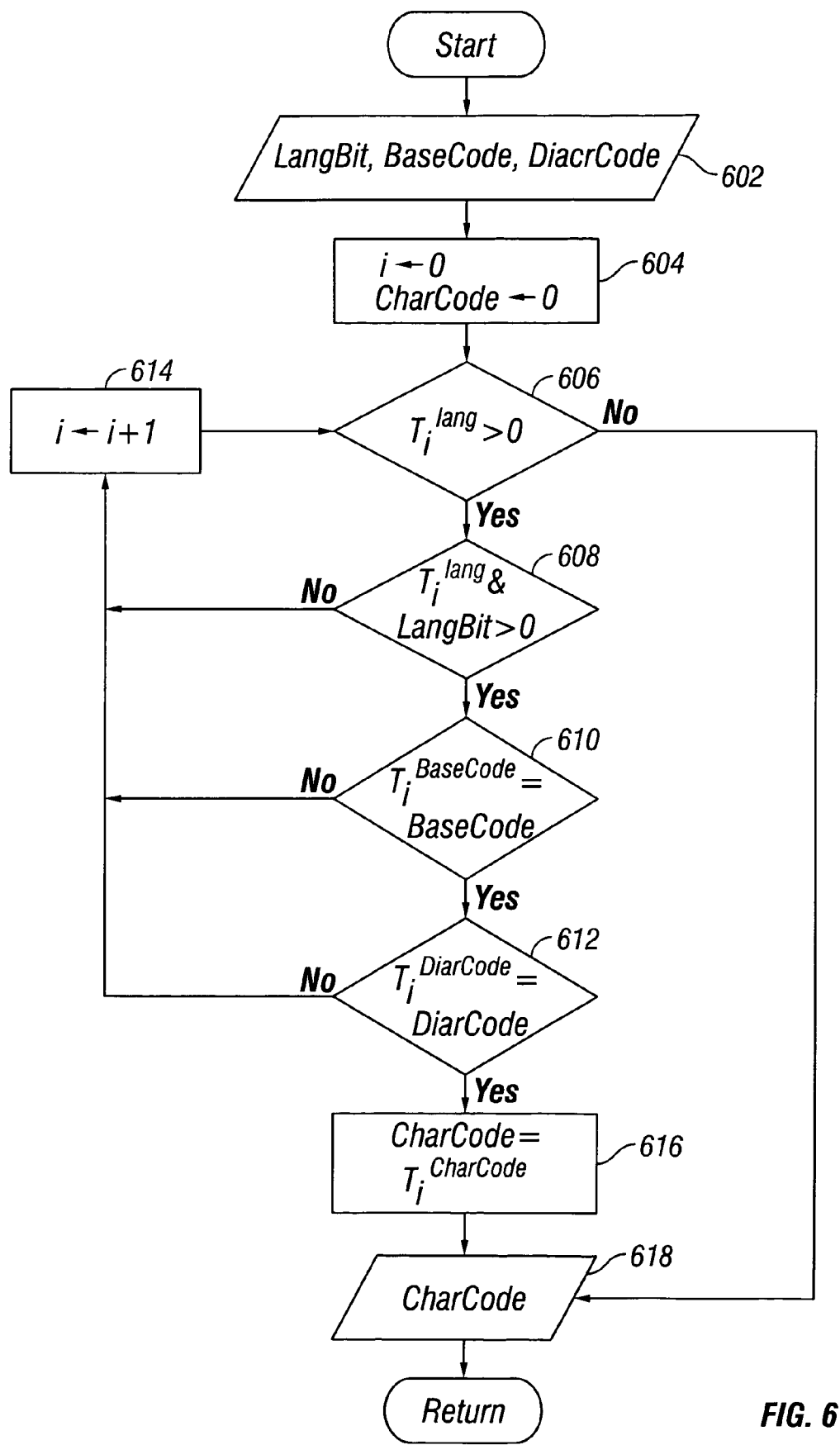
FIG. 6 shows the process flow for establishing a correct diacritic/Base combination.

Referring to FIG. 6, the language code of the alpha character (LangBit), the Base code (BaseCode) and the diacritic code (DiacrCode) are received as input at 602. The diacritic code corresponds with the diacritic Code determined through "Identification of the Diacritic", above. Counters are set to zero 604. For each diacritic in the present embodiment, a bit code is established that defines those languages that use the particular diacritic. The bit code is represented as $T_i^{lang}$. A decision box determines if there is a language included in the present embodiment that contains one of the diacritics. If $T_i^{lang}$ is greater than zero 606, the condition is satisfied. If $T_i^{lang}$ is less than zero, no language contains the diacritic. The original character code of zero, which represents no character, remains. The diacritic matching algorithm is bypassed. A bitwise comparison is then made between $T_i^{lang}$ and the code representing the language of the character to be recognized, LangBit 608. If the language of the character being recognized is one of the languages that uses the given diacritic, then further analysis continues to determine if both the BaseCode, which represents the Base of the alpha character, and DiacrCode, which represents the diacritic, exist in that particular language. If the input language is not one of the languages that use the subject diacritic, the counter is incremented and another subset of languages that use a different, specific diacritic is similarly assessed.

When there is a bit match between the code representing a subset of languages, $T_i^{lang}$ and the code representing the language of the character to be recognized, LangBit, a condition is established to determine if the Base is included in any of the languages represented by $T_i^{lang}$ 610. Other Bases not included in the languages represented by $T_i^{lang}$ may nevertheless be included if the Base is commonly misrecognized as a Base that is included in the $T_i^{lang}$ languages. If the Base is included, the query gives a positive indication and the diacritic is then assessed. If it does not exist in any of the languages represented by $T_i^{lang}$, the counter is incremented 614 and another subset of languages that use a different diacritic is assessed. A query is made with respect to the diacritic 612. If it also is included in the same subset of languages in which the Base was included, then a true diacritic-Base combination exists. A character code is given that identifies the entire character 616. A negative finding causes the counter to increment 614 and a new subset of languages is assessed. The character code is received as output at 618.

Referring to FIG. 2, if the character code is greater than zero 226, then the process is finished 228. The entire character, diacritic and base, have been properly recognized using all parts of the diacritic recognition algorithm. A character code of zero represents ineffective application of the diacritic recognition algorithm. Whole character recognition 206 is attempted in order to determine the alpha character. No other steps are taken. The process is finished 228.

GetImageRuns

GetImageRuns is the computer software module that establishes precisely where the character bitmap image intersects with defined horizontal or vertical lines, thereby establishing bit location information. A flowchart of the software module GetImageRuns is shown in FIGS. 7a-7d. Such modules are commonly known and used in the art. The following GetImageRuns description is a representation of what is generally known in the art.

Figure 7A:
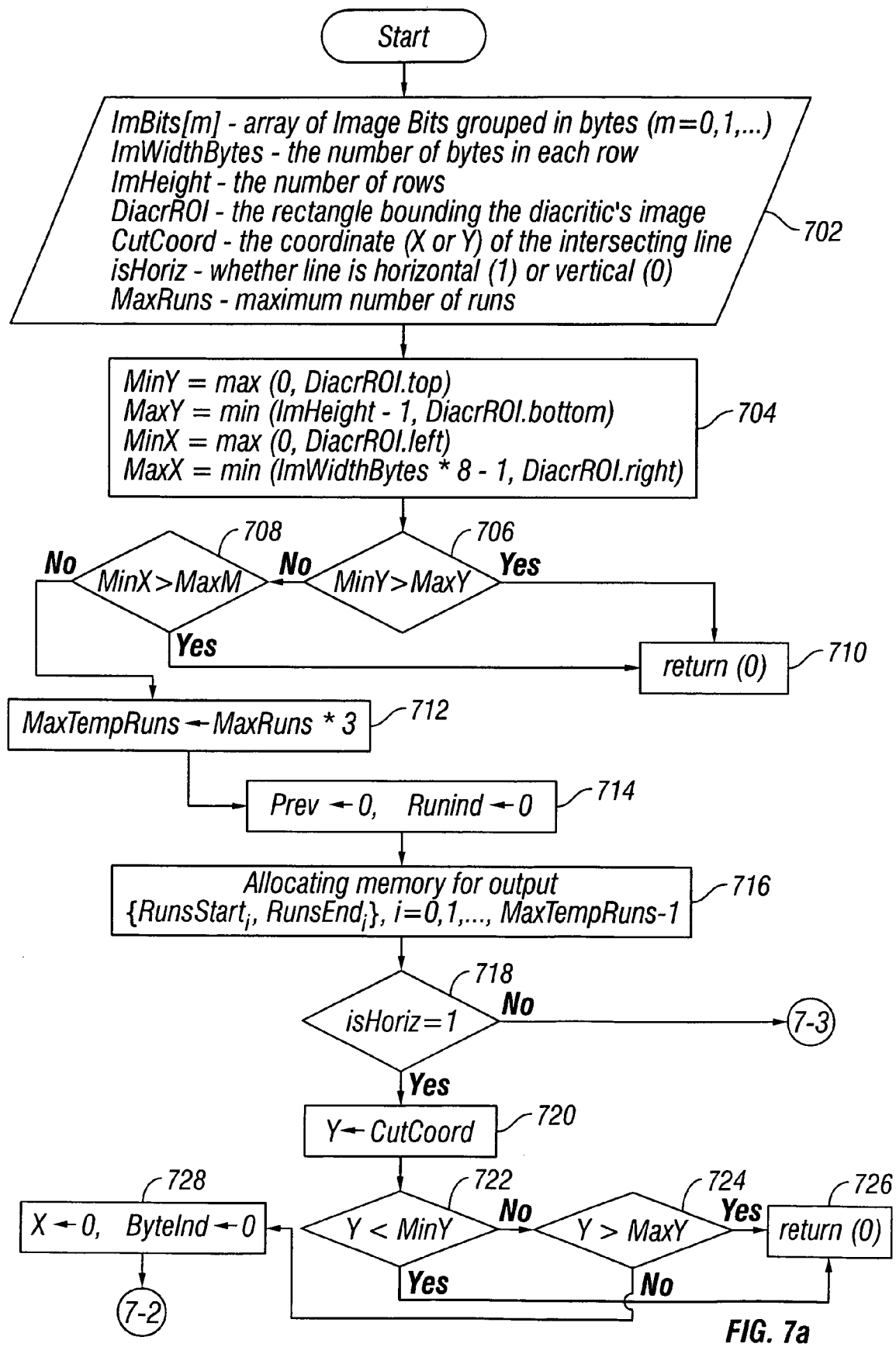
FIGS. 7a-7d display the method of extracting topological features of a diacritic used for recognition in the steps of FIG. 5.

Referring to FIG. 7a, input data is received at 702. The data includes the array of image bits (pixels) in the image zone (ImBits[m]), the number of bytes in a single row of the array (ImWidthBytes) the number of rows (ImHeight), the rectangular area bounding a diacritic (DiacrROI), the x or y-coordinate of an orthogonal line used to determine the pixel pattern along a vertical or horizontal cross-section (CutCoord), an indicator for establishing the orientation of CutCoord (isHoriz), and the maximum number of cross-sections used to establish the pixel pattern within the image zone (MaxRuns). Variables are calculated at 704 to determine the image zone. The decisions at 706 and 708 cause the routine to break (return zero) 710 in the event the calculated variables established at 704 are such that proper image analysis cannot be made. If the calculated variables establish an image zone capable of analysis, a temporary value representing the maximum number of runs (MaxTempRuns) is assigned 712. A run is a series of uninterrupted image bits. The temporary value is assigned to allow for the presence of noise that is later identified and removed. The bit preceding the following bit (Prev) and the run indicator (RunInd) are given initial assignments of zero 714. Prev for the start of a run will not possess image information and therefore it receives an initial value of zero. Image bits, containing image information receive a value of one. Thus, a run is represented as a series of ones preceded and followed by a zero or, if the limitations of the image zone have been reached, the image zone border. RunInd tracks the number of runs generated through one cross-section. Memory is allocated for storing run information 716.

A decision at 718 determines the direction of cross-sectional analysis used to determine runs within the image zone. Such direction is either horizontal, which provides a positive indication, or vertical, which provides a negative indication. Horizontal cross-sections are analyzed first in the present embodiment. The y-coordinate value is assigned at 720 representing the location of the horizontal cross-section. A series of conditions at 722 and 724 ensure that the y-coordinate value is within the image zone. A negative indication causes the routine to break (return zero) 726. Indicators are set to zero at 728. They allow a reiterative analysis for each horizontal cross-section in the image zone and each byte per cross-section.

The pattern within the image zone is determined though cross-sectional analysis along both the horizontal and vertical axes of the image zone. Cross-sections are placed one at a time across the image zone in their respective directions and along a given coordinate. The cross-section consists of a series of bytes, the dimensions being determined by image resolution (pixel size). Thus, a byte is eight pixels in length. The number of bytes representing the cross-section is dependent on the size of the image zone. The bits are zero or one according to whether a white pixel or a black pixel (or other nonwhite color) is found at the respective location; i.e. whether or not a pixel exists. The patterns created enable the image to be patterned as an array of bits.

Figure 7B:
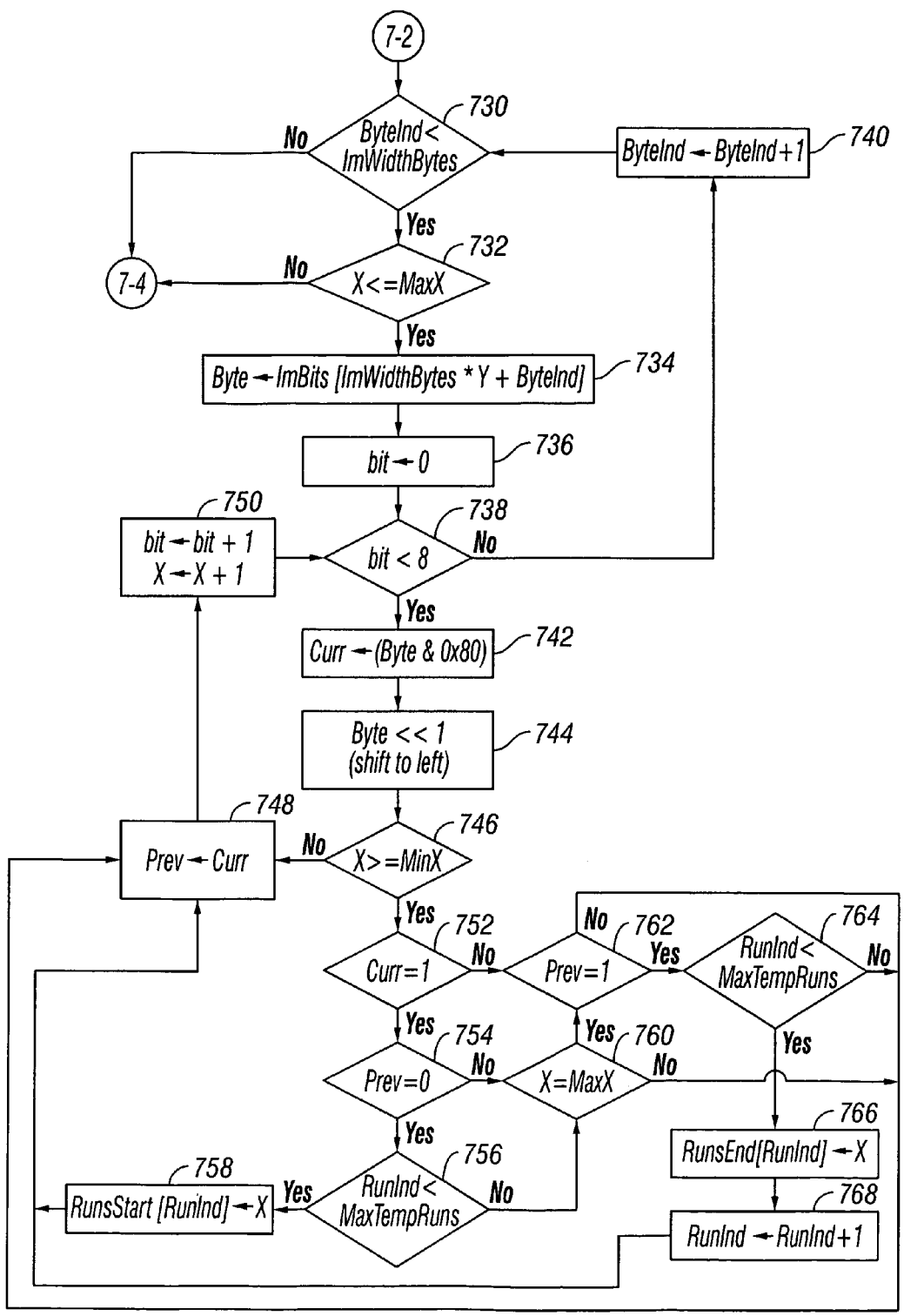

Referring to FIG. 7b, when the byte along the cross-sectional length does not exceed the number of bytes across the image zone 730, analysis continues. A determination is made at 732 to see if the x-coordinate location of the horizontal cross-section does not exceed the horizontal limits of the image zone. These two conditions are used to control the flow. The first condition 730 sends the process to the noise removal routine when the last byte in the last cross-sectional row is exceeded. The second condition 732 sends the process to the noise removal routine when the x-coordinate location has exceeded the horizontal limits of the image box. At 734, the particular byte within the cross-sectional length is defined. Analysis is begun at the first bit in the byte 736. The conditional statement 738 begins analysis of the next cross-sectional byte 740 when all of the bits of the current byte have been analyzed. The process at 742 determines the state of the subject bit. The byte is shifted left one bit 744 so that the next bit is readied for similar analysis. The conditional statement at 746 ensures analysis remains within the image zone. The horizontal limits of the image zone are MinX and MaxX that were calculated at 604. If analysis is outside of the image zone, the current bit (Curr) is assigned to previous bit (Prev) 748 and the x-coordinate and bit numbers are incrementally increased 750 until analysis occurs within the image zone.

Knowing the bit value at specified locations allows the process to set up a series of runs along the cross-section. The maximum number of allowed runs is controlled by MaxTempRuns. The series of conditional statements described below establish the runs while ensuring the MaxTempRuns is not exceeded.

The state of the bit determined at 742 is either zero or one, depending on if a pixel exists at the given cross-sectional location. After determining at 746 that the subject bit is within the image zone, a determination is made regarding the state of the bit. A Curr value of one at 752 and a Prev value of zero at 754 indicates the start of a new run. MaxTempRuns is checked at 756 to ensure that the new run is within the acceptable limit for the maximum number of runs allowed. A run number (RunsStart[RunInd]) is assigned 758 if the run is within acceptable limits. Curr is assigned to Prev at 748 and the counters are increased at 750 so that image zone range checks may be made and to ensure analysis is being done on the same byte. In the next loop, Curr may or may not equal one at 752 but Prev will equal one at 754. In the instance where Curr equals one, a determination is made at 760 to see if analysis has gone beyond the image zone area. If it has not, another loop is made to check the state of the next bit. When there is a loop where Curr no longer equals one, a determination is made at 762 as to the state of Prev. An indication of one for Prev means that the run has concluded. If the number of runs, made thus far for the given cross section is less than the MaxTempRuns 764, an ending run number (RunsEnd [RunInd]) is assigned 766 and the run indicator (Runind) is incrementally increased 768. However, if Runind at 764 is not less than MaxTempRuns, the process will loop to the next bit. No more runs will be established and when the x-coordinate for the cross-section being analyzed is no longer within the image zone (as determined at 732), the process will advance to 7-4.

Figure 7C:
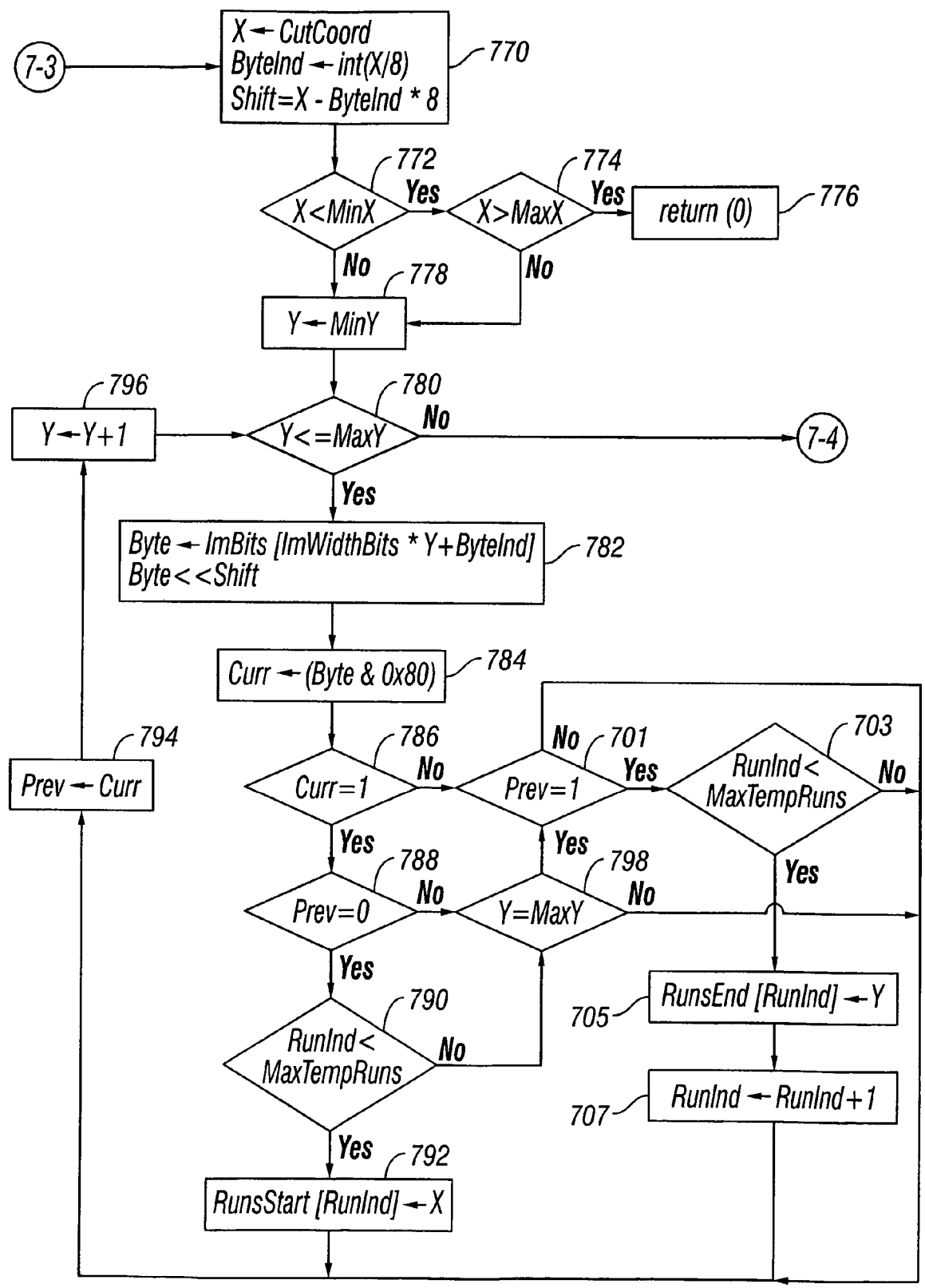

A determination of vertical orientation at 718 produces a vertical analysis of the image zone similar to the horizontal analysis described above. Referring to FIG. 7c, the x-coordinate value is assigned at 770 representing the location of the horizontal cross-section. A series of conditions at 772 and 774 ensure that the x-coordinate value is within the image zone. A negative indication causes the routine to break (return zero) 776.

The minimum y-coordinate value is assigned to the y-coordinate value 778 where the first bit of the first vertical cross-section is assessed. The present byte for analysis is assigned at 782, as is the shifting mechanism for analyzing all of the bits in the byte. The state of the bit is determined at 784.

Just as with the horizontal cross-section analysis above, when the bit value at specified locations is known, it allows the process to set up a series of runs along the cross-section. The maximum number of runs is controlled by MaxTempRuns. The series of conditional statements described below establish the runs while ensuring that MaxTempRuns is not exceeded.

The state of the bit determined at 784 is either zero or one, depending on if a pixel exists at the given cross-sectional location. A Curr value of one at 786 and a Prev value of zero at 788 indicate the start of a new run. MaxTempRuns is checked at 790 to ensure that the new run is within the acceptable limit for the number of runs allowed. A run number (RunsStart[RunInd]) is assigned 792 if the run is within acceptable limits. Curr is assigned to Prev at 794 and the y-coordinate counter is incrementally increased at 796 so that it can be checked that analysis remains within the image zone. In the next loop, Curr may or may not equal one at 786 but Prev will equal one at 788. When Curr equals one, a determination is made at 798 to see if analysis has gone beyond the image zone area. If it has not, the loop continues. When there is an iteration where Curr no longer equals one, a determination is made at 701 as to the state of Prev. An indication of one for Prev means that the run has concluded. If the number of runs, made thus far for the given cross section is less than the MaxTempRuns 703, an end run number (RunsEnd[RunInd]) is assigned 705 and the run indicator (RunInd) is incrementally increased 707. However, if RunInd at 703 is not less than MaxTempRuns, the process continues to the next bit. No more runs will be established and when the y-coordinate for the cross-section being analyzed is no longer within the image zone, as determined at 780, the process will advance to 7-4, noise removal.

Figure 7D:
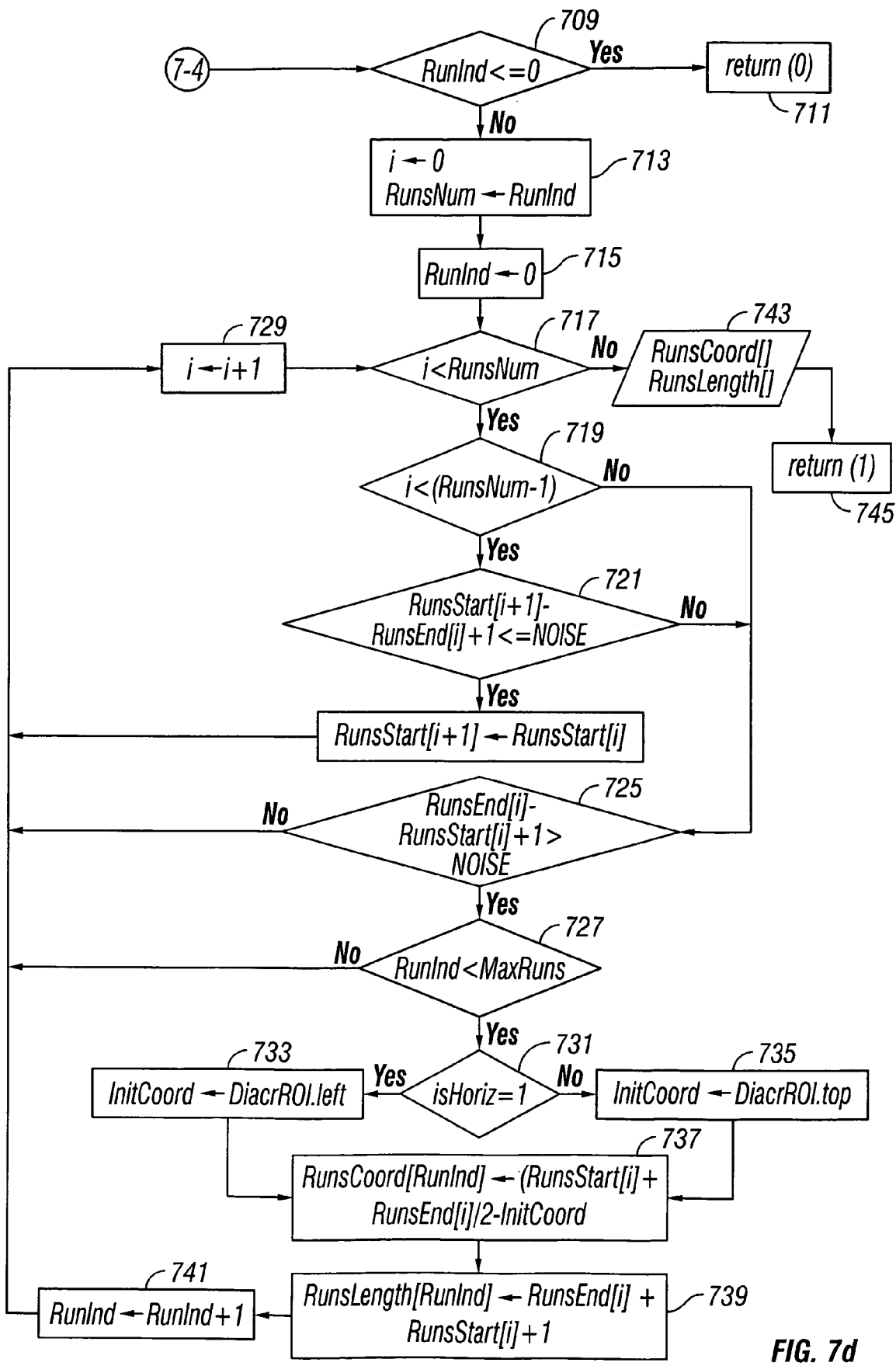

Noise removal begins after all horizontal and vertical runs are made through the image zone. Referring to FIG. 7d, if no runs were made, as determined by the condition at 709, the routine is interrupted (return 0) 711. Indication of at least one run creates the assignments at 713 and 715. While the number of runs remains above zero 717, a check is made for noise; both white noise and black noise. White noise is a white pixel existing where it statistically should not exist. This occurs when a black pixel is missing from the interior of the character being recognized. Due to inefficiencies in the digitization device or in the device or in the actual printing of the character, a print mark was not found at the white pixel location although, statistically, it should have been. While the number of runs remains above one 719, the presence of white noise is checked at 721. If the number of white pixels between the end of a run (RunsEnd) and the start of the succeeding run (RunsStart) is less than or equal to a specified number, the white pixels are considered white noise. If the number of white pixels between adjacent runs is not within the limitations defined as noise, a check is then made to see if there is black noise 725. This is done by checking the number of black pixels between start and end of the same run. If the amount is greater than a predefined limit, it is not considered noise. When it is determined at 725 that the run is not black noise, the run indicator (RunInd) is checked at 727 to see if it is less than the maximum number of allowed runs (MaxRuns). A positive indication to this query causes the noise-checking loop to continue to the next run and run pair to check again for noise. A negative indication suspends the noise-checking loop and determines the location and length of run (which was determined not to be noise). Otherwise, the run numbers are incrementally increased through the counter 729 and next adjacent run pair is checked to see if the white pixels between the runs are white noise or if the first run is black noise.

When the noise-checking loop is suspended, the orthogonal direction of the run is checked at 731 by determining the direction of the cross-section used in determining the run. A horizontal cross-section creates a reference coordinate value (InitCoord) at the ROI edge closest to the abscissa 733. A vertical cross-section creates InitCoord at the ROI edge closest to the ordinate. The midpoint of the run (RunsCoord) is determined at 737 and the length of the run (RunsLength) is determined at 739. RunInd is incrementally increased at 741. No further runs will be analyzed for RunsCoord or RunsLength after MaxRuns is reached, even if there are more runs available for analysis. MaxRuns corresponds to the maximum number of runs anticipated for the given set of diacritics in the present embodiment. Thus, further runs are assumed noise and disregarded. The runs may still be checked for noise, but even if the run is determined at 725 not to be black noise, the condition at 727 will prevent calculation of RunsCoord and RunsLength for that run. After all of the possible runs have been checked, all of the RunsCoord and RunsLength values are output at 743. Recognition continues 745.

Technical Advantages

Accordingly, it is a technical advantage of certain embodiments to perform separate recognition of diacritics through vector analysis on non-English alpha characters. A more focused analysis provides better recognition results. Furthermore, by separating recognition between the diacritic and the Base, the output class for the recognition algorithms is decreased. With a decreased output class, the recognizer has fewer characters to choose from and therefore less probability for error.

Another technical advantage of certain embodiments is to isolate the diacritic from the Base prior to recognition. Isolating the diacritic from the Base allows the recognition algorithms to focus on the specific components of the alpha character. It also provides for better filtering by ignoring pixels outside the isolated regions.

A further technical advantage of certain embodiments is lowered computational complexity and increased recognition speed through a pre-recognition step for the diacritic coupled with the smaller output class.

Yet another technical advantage of certain embodiments is the ability to perform an error check by checking for acceptable combinations of a separately recognized Base and diacritic.

And a still further technical advantage of certain embodiments is the ability to correct a misrecognized Base when the recognized diacritic is in proper combination with a Base that is commonly misrecognized as the misrecognized Base.

Further technical advantages of certain embodiments will become apparent from a consideration of the drawings and prior description.

SUMMARY

Thus, it is apparent that there has been provided in accordance with embodiments of the present invention, a method for optically recognizing a multi-language set of letters with diacritics that satisfies the advantages set forth above. Although certain embodiments have been described in detail, it should be understood that various changes, substitutions, and alterations could be made herein. For example, different vectors could be used to extract geometric information. Furthermore, altogether different geometric information could be obtained for use in determining the particular diacritic. Other examples are readily ascertainable by one skilled in the art and could be made without departing from the spirit and scope of the present invention as defined by the following claims.

What is claimed is:

1. A computerized method of identifying characters in a character recognition system having a processor, the method comprising:
   a) analyzing, in conjunction with the processor, a character image for separation and extraction of a base character and one or more diacritics;
   b) applying, in conjunction with the processor, optical character recognition or intelligent character recognition algorithms to the base character;
   c) processing, in conjunction with the processor, the diacritics with at least one of image analysis and pattern recognition algorithms; and
   d) combining, in conjunction with the processor, the results of b) and c) so as to check for acceptable combinations of the base character and diacritics with respect to one or more specific languages.

2. The method. of claim 1, additionally comprising assigning a computer code to an acceptable combination of the base character and diacritics corresponding to the character image.

3. The method of claim 1, wherein the character image comprises more than one diacritic component.

4. The method of claim 1, wherein analyzing the character image comprises digitizing a document having printed characters.

5. The method of claim 4, wherein the digitizing is performed by one of a scanning device, a facsimile machine and a digital camera.

6. The method of claim 1, wherein analyzing the character image comprises identifying an alphabetic type character.

7. The method of claim 1, further comprising performing a quantitative image analysis to determine a black pixel count for each of the extracted components.

8. The method of claim 7, further comprising assigning the extracted component containing the greatest number of black pixels as the base character.

9. The method of claim 1, wherein the acceptable combinations that exist between the base character and the diacritics are limited by one of the languages.

10. The method of claim 1, wherein combining the results comprises determining whether the base character and the diacritics are an acceptable combination.

11. The method of claim 10, wherein determining whether the base character and the diacritics are an acceptable combination comprises using a sequence of non-English languages.

12. A computerized method of identifying characters having a diacritic component in a character recognition system having a processor, the method comprising:
   segmenting, in conjunction with the processor, a base component and a diacritic component from a character image;
   recognizing, in conjunction with the processor, the base component;
   recognizing, in conjunction with the processor, the diacritic component;
   performing, in conjunction with the processor, a match analysis to determine whether the base component and the diacritic component is an acceptable combination for one or more particular languages; and
   recognizing, in conjunction with the processor, the combination of the base component and the diacritic component in response to the match analysis.

13. The method of claim 12, wherein the character image comprises more than one diacritic component.

14. The method of claim 12, additionally comprising assigning a computer code to an acceptable combination of the base and diacritic corresponding to the character image.

15. The method of claim 12, wherein the one or more particular languages are non-English languages.

16. The method of claim 12, additionally comprising extracting data from data fields on a document having printed characters.

17. The method of claim 16, additionally comprising digitizing the extracted data.

18. The method of claim 17, additionally comprising:
   determining if the digitized data is from a non-constrained text field; and
   segmenting the non-constrained textual field data.

19. The method of claim 12, wherein segmenting the character image comprises identifying an alphabetic type character.

20. The method of claim 12, further comprising performing a quantitative image analysis to determine a black pixel count for each of the segmented components.

21. The method of claim 20, further comprising assigning the segmented component containing the greatest number of black pixels as the base component.

22. The method of claim 13, further comprising:
   determining a relative location between two or more diacritic components; and
   assigning a label to each of the two or more diacritic components based on their respective relative locations.

23. The method of claim 12, further comprising recognizing the base component using one of optical character recognition and intelligent character recognition.

24. The method of claim 12, wherein the acceptable combinations that exist between the base component and the diacritic component are limited by one of the languages.

25. The method of claim 12, wherein performing the match analysis comprises determining whether the base component and the diacritic component is an acceptable combination using a sequence of non-English languages.

26. The method of claim 12, additionally comprising:
   determining during the match analysis whether the base component is one of a plurality of commonly misrecognized base components;
   determining if the commonly misrecognized base component can be matched with the recognized diacritic component;
   determining the base component that is commonly misrecognized as the commonly misrecognized base component; and matching the base component to the diacritic component when the commonly misrecognized base component does not match with the diacritic.

27. A system for recognizing characters, the system comprising:
   a processor;
   a computer readable medium storing algorithms operable to cause the processor to perform:
      a) an analysis process configured to analyze a character image so as to segment a base component and one or more diacritic components;
      b) a character recognition algorithm configured to recognize the base component;
      c) a diacritic recognition algorithm configured to process the diacritic components of the character image; and
      d) a diacritic matching algorithm configured to combine the results of b) and c) to check for acceptable combinations of the base component and diacritic components for specific languages.

28. The system of claim 27, wherein the diacritic matching algorithm is further configured to recognize and assign a computer code to an acceptable combination of the base component and diacritic components corresponding to the character image.

29. A system of identifying characters having a diacritic component, the system comprising:
   a processor:
   a computer readable medium storing algorithms operable to cause the processor to perform:
      a character parts segmentation process configured to segment a character image so as to extract a base component arid a diacritic component;
      a character recognition algorithm configured to recognize the base component;
      a diacritic recognition algorithm configured to recognize the diacritic component of the character image; and
      a diacritic matching algorithm configured to determine whether the base component and the diacritic component are an acceptable combination for a particular language and to recognize the combination.

30. The system of claim 29, wherein the diacritic matching algorithm is further configured to assign a computer code to an acceptable combination of the base component and the diacritic component.

31. The system of claim 29, wherein the particular language is a non-English language.

32. A computer readable medium having computer readable program code embodied therein for identifying characters having a diacritic component, the computer readable code comprising:
   a character parts segmentation process configured to segment a character image so as to extract a base component and a diacritic component;
   a character recognition algorithm configured to recognize the base component;
   a diacritic recognition algorithm configured to recognize the diacritic component of the character image; and
   a diacritic matching algorithm configured to determine whether the base component and the diacritic component are an acceptable combination for a particular language and to recognize the combination.

* * * * *

UNITED STATES PATENT AND TRADEMARK OFFICE
CERTIFICATE OF CORRECTION

PATENT NO. : 7,512,272 B2  Page 1 of 1
APPLICATION NO. : 10/959447
DATED : March 31, 2009
INVENTOR(S) : Isaac Mayzlin and Emily Ann Deere It is certified that error appears in the above-identified patent and that said Letters Patent is hereby corrected as shown below:

| Column | Line | Description of Error |
|---|---|---|
| 7 | 67 | Change "the-diacritic" to --the diacritic--. |
| 10 | 8 (Approx.) | Change "diaresis" to --dieresis--. |
| 11 | 31 | Change "diaresis" to --dieresis--. |
| 17 | 46 (Approx.) | Change "(Runind)" to --(RunInd)--. |
| 18 | 66 | Change "(Runind)" to --(RunInd)--. |
| 18 | 67 | Change "Runind" to --RunInd--. |
| 21 | 38 (Approx.) | In Claim 2, change "method." to --method--. |
| 23 | 28 | In Claim 29, change "processor:" to --processor;--. |
| 23 | 33 | In Claim 29, change "arid" to --and--. |

Signed and Sealed this

Fifteenth Day of December, 2009

David J. Kappos
*Director of the United States Patent and Trademark Office*